United States Patent [19]
Johnson

[11] 4,017,744
[45] Apr. 12, 1977

[54] DIGITAL FIRING PULSE GENERATOR FOR THYRISTOR POWER CONVERTERS

[75] Inventor: Frederick O. Johnson, Monroeville, Pa.

[73] Assignee: Westinghouse Electric Corporation, Pittsburgh, Pa.

[22] Filed: Dec. 22, 1975

[21] Appl. No.: 642,814

[52] U.S. Cl. .............. 307/252 Q; 307/269; 321/69 R; 323/22 SC

[51] Int. Cl.² ............. H03K 17/72; H02M 7/155; H02M 5/257

[58] Field of Search ....... 307/252 P, 252 N, 252 Q, 307/252 VA, 269; 323/225 SC; 321/7, 40, 69

[56] References Cited
UNITED STATES PATENTS 3,648,148  3/1972  Bechet et al. ............... 321/40 X
3,735,241  5/1973  O'Sullivan ................. 307/252 Q Primary Examiner—John Zazworsky
Attorney, Agent, or Firm—C. M. Lorin

[57] ABSTRACT

A digital pulse generator for firing thyristors in a polyphase converter system is described in an hybrid analog-digital and in an all digital form. A phase locked oscillator associated with a digital counter generates timing waveforms synchronized with the phase lines to establish firing angles in relation to a reference signal. Each firing pulse triggers the logic circuit of a distributor and a multiplexer is coupled with such logic circuitry in order to insure that the proper timing waveform is selected so as to match the selection of the next thyristor to be fired.

3 Claims, 21 Drawing Figures

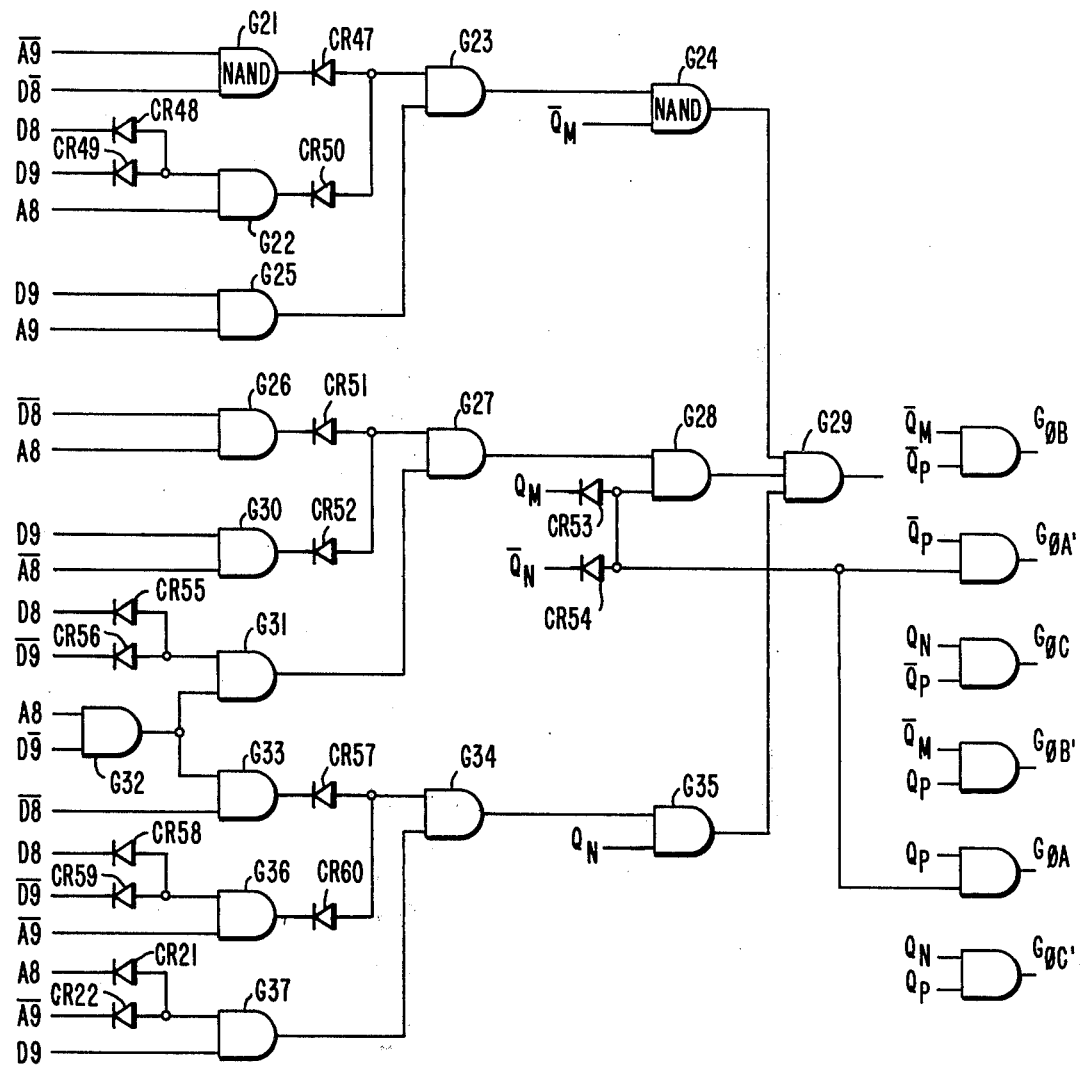
FIG.IOE

DIGITAL FIRING PULSE GENERATOR FOR THYRISTOR POWER CONVERTERS

CROSS-REFERENCE TO RELATED PATENT APPLICATIONS

The present application is related to the following concurrently filed patent application which is assigned to the same assignee as the present application:

Ser. No. 642,809, which was filed on Dec. 22, 1975 by Richard L. Detering.

BACKGROUND OF THE INVENTION

The invention relates to firing pulse generators for thyristors, and similar types of static electric valves such as used for power conversion in polyphase electrical supply. Digital firing pulse generators are known from "Thyristor Phase-Controlled Converters and Cycloconverters" by B. R. Pelly, chapter ten, pages 248-277 - John Wiley and Sons 1971. Of importance with such systems is the reliability and accurcy of the control pulses. Phase-locked oscillator techniques have been used in order to obtain pulse timing which is independent from actual fluctuations in the power lines, so that, for the purpose of establishing an accurate firing angle, the firing instant is fixed in electrical degrees. Thus, U.S. Pat. No. 3,534,285 entitled "Digital Phase Control Circuit for Synchronizing an Oscillator to a Harmonic Or a Reference Frequency" by P. J. Kobold et al issued Oct. 13, 1970 teaches a system where a signal is applied to a phase detector which in turn controls a voltage controlled oscillator that generates a signal applied to a counter for providing a binary output.

Such a voltage controlled oscillator when synchronized with the phase line of a polyphase AC power system, as described in U.S. Pat. No. 3,891,912 of Watanabe, may provide a binary output to be compared with a voltage reference signal for generating firing pulses, at selected firing angles, to thyristors connected in a polyphase arrangement on the power lines. The thyristors in the Watanabe Patent are fired in succession by a ring counter triggered on each comparison. At the same time, the binary count in the counter is modified in its most significant digits so as to generate in a ring fashion, upon each triggering by the comparator, a binary representation of the subsequent phase of the power lines in which the next controlled rectifier to be fired is connected. However, in the Watanabe system, should a lack of concordance occur during transition of the ring counter, the binary counter, or both, a proper correspondency between the phase represented by the digital count and the selected rectifier to be fired no longer exists. Improper firings will result.

In order to overcome this drawback, the present invention proposes that the comparator trigger only the ring counter and that the ring counter be locked with the digital counter used for the determination of the firing angle and the generation of a triggering pulse.

SUMMARY OF THE INVENTION

The invention relates to digital phase controllers as can be used for controlling the firing angles of a polyphase AC converter system. The digital phase controller according to the present invention establishes a firing angle for successive power thyristors of a converter system, as prescribed by a reference analog or digital signal and low level logic signals are generated as output signals for firing control.

The digital phase controller according to the present invention includes a circuit for the generation of an electrical signal representinng the desired electric angle from a point in time corresponding to zero crossing of the AC supply. A variable frequency oscillator generates between successive zero crossings in one direction N pulses at a frequency which depends upon the length of the fundamental cycle, so that each pulse represents an exact increment of $2\pi/N$ of electrical angle. An instantaneaous count of said pulses is derived in digital from which represents an electrical angle counted for each phase line from a corresponding crossover. For each such count a saw-tooth signal is derived so as to integrate the digital count, for the purpose of analog comparison with the analog reference signal. When the comparator reaches equality the firing pulse is triggered and a pulse is applied to the power thyristor of the associated phase and appropriate polarity.

The apparatus according to the present invention may take two forms. In one form a hybrid analog-digital circuitry is used including a digital-analog converter for the comparator. The second is all digital circuitry. In the latter case, if the reference signal is analog, it is first converted into digital form so that comparison can be performed digitally.

The invention also provides for effective rectification and inversion end stops. The rectification end stop limits the firing angle advance so that the power thyristor does not receive a gating fire pulse before it is capable of conducting. The inversion end stop limits the firing angle retardation so that the power thyristor receives the gating fire pulse before the available commutating voltage has become too low.

BRIEF DESCRIPTION OF THE DRAWINGS

FIG. 10E illustrates the digital comparator in a specific embodiment of FIG. 9 and the 3-stage section of the digital comparator of FIG. 9;

DESCRIPTION OF THE PREFERRED EMBODIMENT

DIGITAL FIRING PULSE GENERATOR

Figure 1:
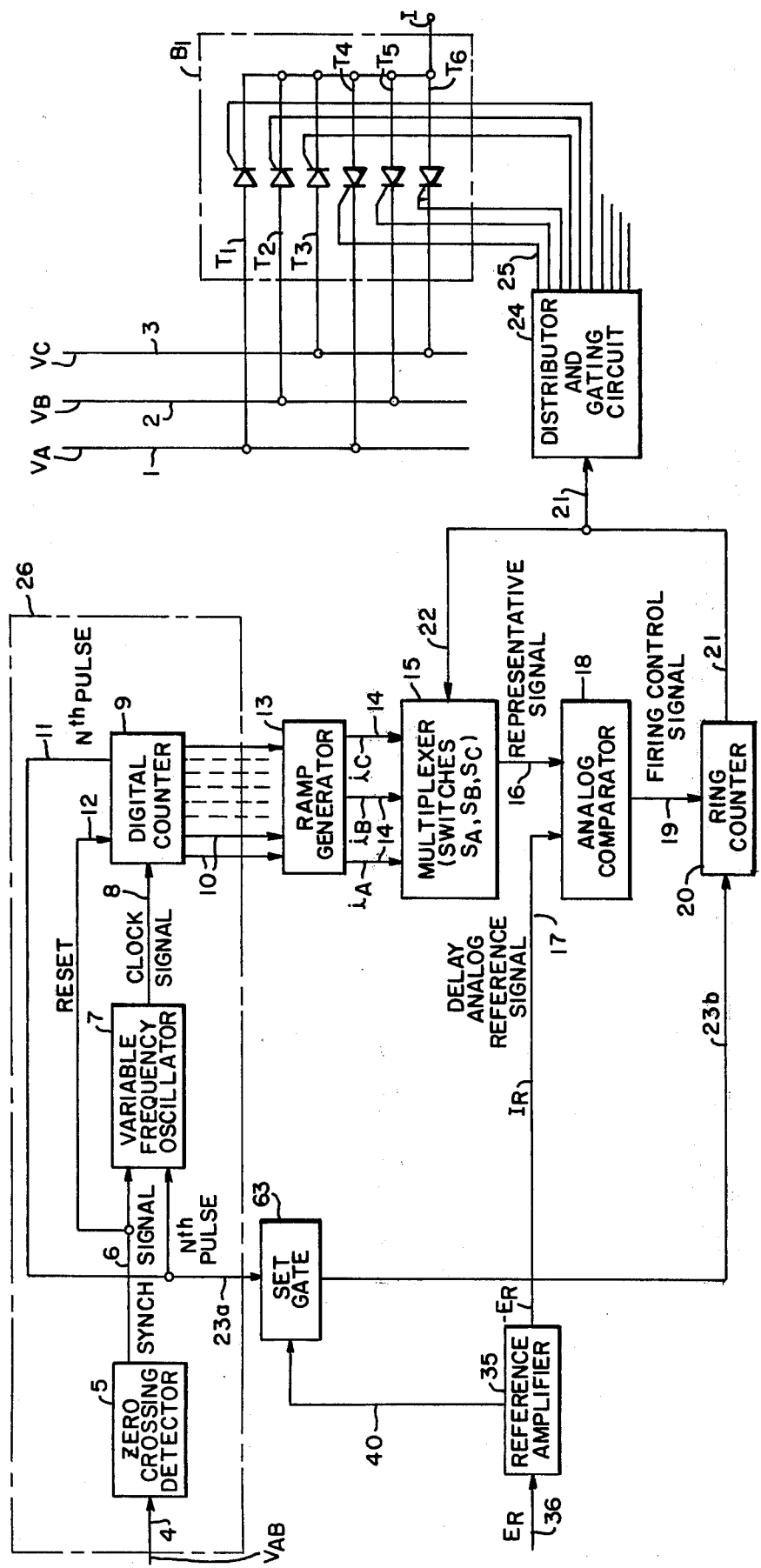
FIG. 1 shows diagrammatically the digital pulse generator according to the present invention.

FIG. 1 shows a bank $B_1$ of six bridge power thyristors $T_1 - T_6$ connected across a balanced three-phase system supplying voltages $V_A$, $V_B$, $V_c$ on three busses 1, 2, 3. The thyristors are gated for conduction from separate lines 25. The firing circuit in accordance with the present invention includes a zero-crossing detector 5 supplied on line 4 with a reference wave $V_{AB}$ corresponding to one phase of the power supply. Each time the reference waveform passes by zero in one direction, zero-crossing detector 5 generates a pulse which is synchronized with such passing through zero. A variable frequency oscillator 7 generates a clock signal on line 8 which has a frequency determined by the relation between two input signals fed on respective lines 6 and 11. The clock signal on line 8 is fed into a digital counter 9 thereby to generate in digital form, on lines 10, a digital representation of the number of clock pulses received since the last passing by zero of the reference waveform. N pulses are thus generated between two successive synchronization signals on line 6, so that between each clock signals a time interval equal to $2\pi/N$ is established. The digital counter has a selected number of digits, ten in this case. The Nth, or most significant digit, is fed back on line 11 as a second input to variable frequency oscillator 7. The variable frequency oscillator 7 is so arranged that the frequency of the oscillator is decreased whenever an Nth pulse characterizing a ONE is generated on line 11 before the occurrence of the expected synchronized pulse on line 6, and that the frequency of the oscillator 7 is increased whenever the Nth pulse on line 11 occurs after such synchronized pulse. When the occurrence of the Nth pulse on line 11 coincides with the occurrence of the synchronized signal on line 6 e.g. it is concommitant with a zero-crossing, the digital counter totalizes exactly N pulses spread over 360° electrical angles, thus between two zero-crossings in one direction. In other words, the time spread of the N pulses digitally stored between successive zero-crossing of the reference waveform $V_{AB}$ is kept such that it matches exactly the cycle of the power supply. Digital counter 9 is reset via line 12 thereby to initiate a new count of N pulses. Should the phase, or the frequency, of the power supply be altered by some transient variation, the synchronized signal is retarded, or advanced, to the same extent. Such lag, or lead, on line 6 will accordingly create an opposite change in the occurrence of the Nth pulse fed back on line 11 so that the variable frequency oscillator will experience a correspondiing change in the frequency of the clock signals on line 8. Therefore, the count in digital counter 9 will bring the Nth pulse in time concordance with the line zero-crossing. The N pulses will have been compressed, or decompressed, so as to maintain an electric angle between each pulse which is always equal to $1/N \times 360$ degrees. As a result, counting in digital counter 9 will occur by increments representing $2\pi/N$ of the $V_{AB}$ sinusoidal time reference.

The zero-crossing detector 5, the variable frequency oscillator 7 and the digital counter 9 together form a phase locked digital device 26 providing at its output, on lines 10, a digital representation of the instantaneous electric angle of the reference waveform $V_{AB}$ between two successive zero-crossings. The phase locked digital device 26 is, according to the present invention, used for the generation of firing pulses with improved accuracy to provide improved control in a power converter system which, although schematized in FIG. 1 as a bridge, or a bank $B_1$ of thyristors, may be other types of AC to DC, or AC to AC converter, or a cycloconverter.

The digital output of the phase locked digital device 26 on lines 10 is converted by a ramp generator 13 into three timing waveforms $i_A$, $i_B$, $i_C$ representing in analog form the successive counts of digital counter 9 for three phases shifted relative to each other by 60°. Generator 13 provides in fact an analog representation in amplified form of the electrical angle given digitally by counter 9, and such representation is linear as a function of time. Accordingly, the sinusoidal wave of the reference phase $V_{AB}$ one line 4 has in fact been converted into a linear function $i_A$ having a slope selected as required for an accurate control of the firing angle. Since, as shown by curves (a) on FIG. 2, phases A, C', are shifted relative to one another by 60°, only one phase is necessary for establishing the electrical angle at any given time and a similar electrical angle is also established for each of the other phases.

Figure 2:
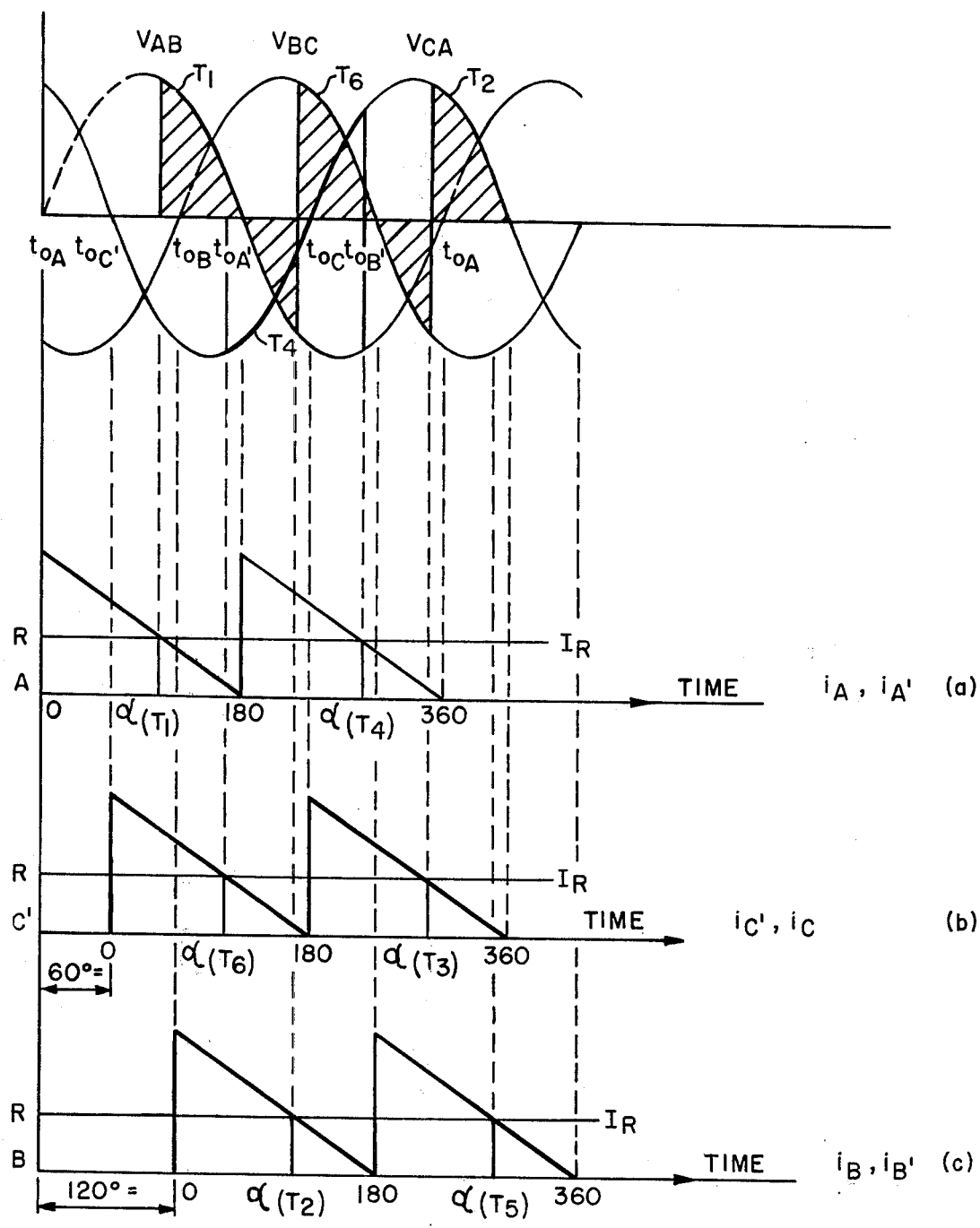
FIG. 2 shows the phase voltages of the power supply with the periods of conduction of the thyristors, and three timing waveforms (a), (b), (c) used with a reference voltage to establish the firing angle.

Generator 13 repeatedly derives a ramp $(i_A i_A', i_B, i_B, i_C, i_C')$, on FIG. 2) synchronized with the reference $V_{AB}$. Therefore, signal $i_A$ actually consists in a series of sawtoothes $i_A$, $i_A'$ of 180° width for alternate polarities. Similarly, signals $i_B$, $i_B'$ and $i_C$, $i_C'$ are derived which are identical to $i_A$, but shifted by 60° from one another in succession. Signals $i_A$, $i_A'$, $i_B$, $i_B'$, $i_C$, $i_C'$ appear at the output of generator 13 on lines 14. Each signal such as $i_A$, $i_B$ or $i_C$, is a timing waveform representing the electrical angle instantaneously along the voltage curve $V_{AB}$, $V_{BC}$ or $V_{CA}$. A multiplexer 15 selects successively one of these signals after being gated by a select signal on line 22. Such selected signal appears on line 16 at the output of multiplexer 15, in accordance with the selected phase A, B or C of the power supply.

An analog reference singal $I_R$ (FIG. 2) on line 17 determines the firing angle ($\alpha$) of the selected thyristor, or thyristors. For the purpose of illustration, the firing angle $\alpha$ is shown by reference to $T_1$ and $T_4$ for the common phase $V_{AB}$, on FIG. 2. The delay from the instant of zero-crossing (which is time $t_{0A}$ for the positive polarity, and $t_{0A}'$ for the negative polarity) is established by a concurrence in time between the ramp of the representative signal on line 16 and the analog reference signal $I_R$ supplied on line 17. Coincidence is established by a comparator 18, which upon equality generates a firing control signal on line 19. Since, as indicated earlier, each representative signal is shifted by the same phase 60°, only one comparator is necessary. A ring counter 20, actuated by the firing control signal on line 19, is provided in order to strobe a distribution and gating circuit 24 via line 21. Circuit 24 shapes and generates firing pulses in accordance with a logic pattern which is effective to gate the selected thyristor, or thyristors, such as $T_1 - T_6$ in bank $B_1$ on FIG. 1. In the example shown, $T_1$, $T_2$ and $T_3$ are affected to respective phases A, B, C for one polarity. $T_4$, $T_5$, $T_6$ correspond to the second polarity. The ring counter 20, also sets the multiplexer 15 via line 22 thereby to select the subsequent representative signal to be derived from lines 14 after a firing operation.

The operation of the digital firing pulse generator is as follows:

The digital counter 9 is driven synchronously with the AC supply frequency by means of the synchronization signal on line 6. The digital counter drives the ramp generator 13 which produces the indicated set of twin precision timing waveforms $i_A$, $i_A'$, $i_C$, $i_C'$, and $i_B$, $i_B'$. These timing waveforms are identical and mutually displaced from each other by sixty electrical degrees. They are so synchronized with the supply voltage (60 Hz), for instance, that $i_A$ is exactly in phase with voltage $v_{AB}$ but at twice the frequency. It follows that, for a balanced three phase power source, $i_C'$ and $i_B$ are similarly inpahse with $-V_{CA}$ and $v_{BC}$ respectively. In the same fashion, $i_A'$, $i_C$, $i_B'$, are in phase with $-V_{AB}$, $V_{CA}$ and $-V_{BC}$, respectively.

The crossover between a given timing waveform and the analog reference signal (i.e., when the magnitude of $i_A$ transfers from a value greater than the magnitude of $I_R$ to a value less than $I_R$) determines when gate drive to a given thyristor in the power converter should be initiated. The greater the value of $I_R$ the earlier in the half cycle this crossover will occur, and vice versa as $I_R$ is decreased.

The timing waveforms $i_A$, $i_B$, and $i_C$ are sequentially compared to $I_R$ in the analog comparator 18 by means of multiplexer 15, causing a selective switching for one of the timing waveforms. Switching is determined by a three stage counter which has six discrete states. Three switches $S_A$, $S_B$, $S_C$ are permitted to conduct each during a given period. Assume $S_A$ is closed so that $i_A$ is being compared to $I_R$. As $i_A$ becomes less than $I_R$ the analog comparator produces a pulse to advance the three stage counter by one state thus causing $S_A$ to open and $S_C$ to close. Thereafter, $i_C$ is being compared to $I_R$, and so on. The states of the three-stage counter are appropriately decoded by the logic of the distributor 24 so as to produce a set of six pulse waveforms which serve as the gate drive waveform for the respective power thyristors, $T_1 - T_6$ on FIG. 1. For a given value of $I_R$, each gate logic signal is a logic zero for 60° and a logic one for 300° of a cycle. Gate drive for the converter thyristor associated with a particular gate logic signal is initiated as the logic signal transfers from a ONE to a ZERO.

The phase displacement of an ON period for a given gate drive waveform with respect to its respective timing waveform is determined by the magnitude of $I_R$. This phase displacement is commonly called the firing angle and may, theoretically, rage over 180°. For practical purposes, the range is typically limited to about 150° to assure proper commutation of the power thyristors in the converter. So-called rectification and inversion end stops are introduced, as explained hereinafter, in order to constrain the maximum advance nd retardation of a given firing angle to about 10° and 160° respectively. The end stops are effected by appropriately clamping the maximum and minimum values of the analog reference within the Reference Amplifier 35 and consequently limiting the range over which a comparison can be made from line 17 between the timing waveforms and the output of the reference amplifier.

Alignment of the three-stage counter 20 with the reference wave $v_{AB}$ is required in order to obtain proper output gate drive waveforms. This is achieved by the set gate 63.

Figure 3:
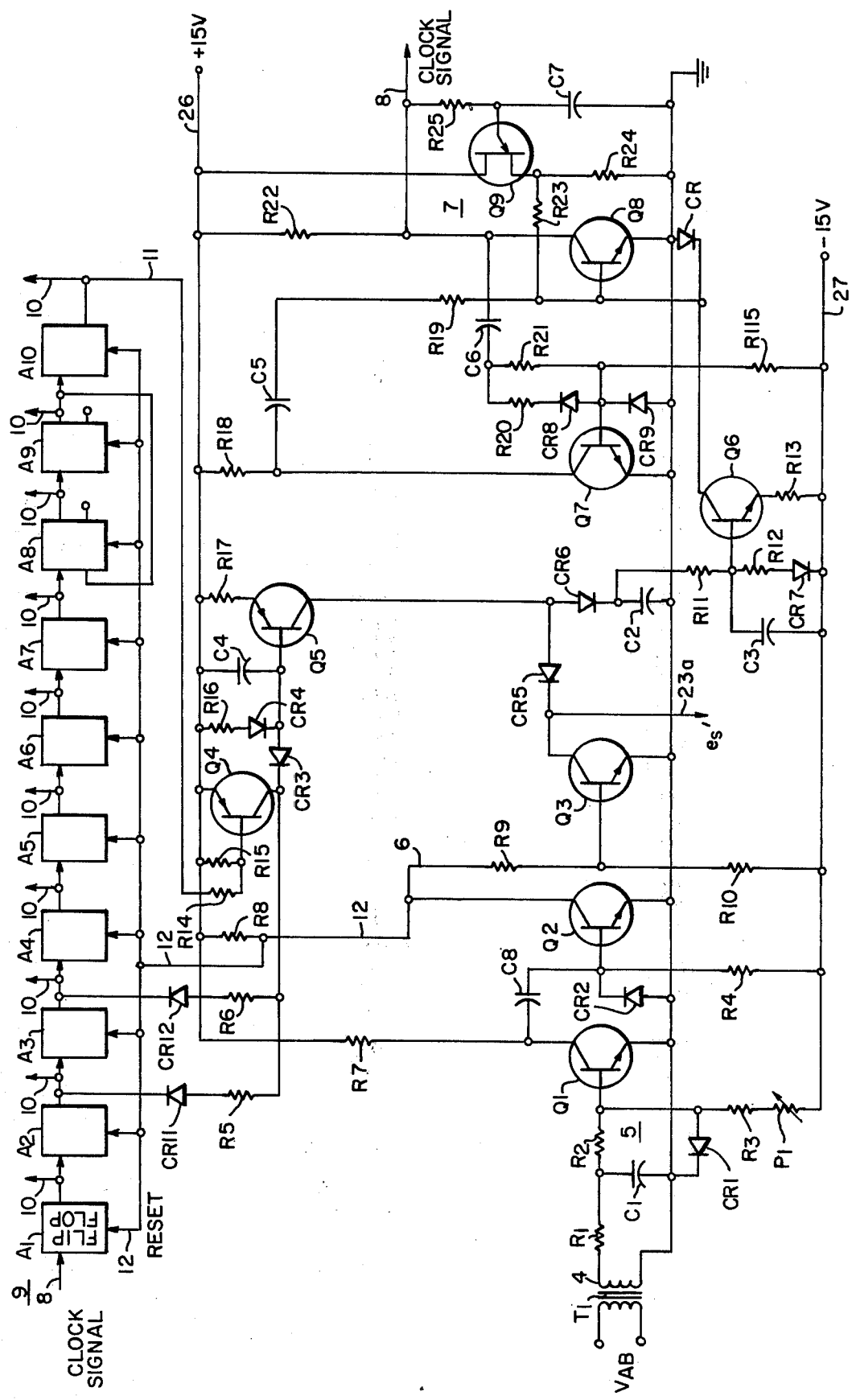
FIG. 3 shows the phase locked oscillator generating synchronized clock signals and the associated digital counter in a preferred implementation of the digital pulse generator of FIG. 1.

FIG. 3 shows in more details the phase locked controller 26. The digital counter 9 is shown as a 10-stage digital counter consisting of 10 flip-flops $A_1 - A_{10}$. The number of flip-flops in the digital counter is prescribed by the desired accuracy of the control. An accuracy of 1% of full converter output voltage is desired for this particular application of the invention. The relationship between converter output voltage and firing angle, $\theta$, is $E_o = E_{MAX} \cos \theta$ (for continuous current operation) The maximum sensitivity is in the region where $\theta = 90°$.

$$\cos 89.5° = .0087$$

$$\cos 90° = 0$$

It follows that 0.5° control resolution for $\theta$ will provide in the worst case, an accuracy for the converter output voltage of $(\cos 89.5° - \cos 90°) \times 100\% = 0.87\%$. The digital counter is conveniently designed to have seven bits for each 60 electrical degrees thereby to afford a resolution of $60/2^7 = 60/128$, thus smaller than 0.5°. The first seven flip-flops, A1 – A7, of FIG. 3 are connected as a conventional serial divider. Flip-flops A8 and A9 perform a divide by three function in order to permit identification of each of the three phases and A10 divide by two operation in order to identify each polarity. As a result A1 through A9 perform for each phase a cyclic operation every 180° at a rate of 120Hz (for a 60 Hz supply frequency) and A10 discriminates between half cycles of the 60 Hz output. This counter, when driven by the N pulses of the synchronized clock, will output a digital representation of a time interval which is synchronized with the supply frequency. The outputted digital count is divided into segments of 60° which are multiplexed to develop a balanced three-phase output as will be described hereinafter in relation to the ramp generator 13.

The phase locked digital device 26 will now be considered in detail by reference to FIG. 3.

A first feature is the generation of a synchronization pulse 6 by the zero-crossing detector 5. With the line-to-line voltage $V_{AB}$ as reference wave, a reference voltage is derived via an isolation transformer $T_1$ and a phase shifting network $R_1$, $C_1$. The reference voltage is sinusoidal and lags by 60° the line-to-line voltage $V_{AB}$. Zero-crossing is detected when the reference voltage crosses zero in the positive direction. At this point the counter 9 is set via line 12 to a state where all outputs of flip-flops $A_1 - A_{10}$ are ZEROS.

Transistors $Q_1$, $Q_2$ and the associated components form a one-shot oscillator which is triggered by each negative going zero-crossing of the base voltage of $Q_1$. $R_1$ and $C_1$ are selected so that the voltage $V_{c1}$ between terminals of capacitor $C_1$ lags $-V_{AB}$ by slightly more than 60° with the loading on $R_2$ due to $V_{c1}$. $R_1$, $R_2$, $R_3$, $C_1$ and $P_1$ are precision components with low thermal drift coefficients. When $V_{c1}$ is sufficiently positive $Q_1$ is saturated and $Q_2$ is blocking. As a result the logical state on the collector of transistor $Q_2$ is a ONE. As $V_{c1}$ approaches zero, while decreasing, transistor $Q_1$ transfers to a blocking state and $Q_2$ saturates for a period of about 0 microseconds. Accordingly the logic state on line 12 is now ZERO. As a result, the reset terminals of J–K flip-flops $A_1 - A_7$, $A_8$, $A_9$ and $A_{10}$ are held at a logic zero forcing the counter to the desired state. Potentiometer $P_1$ is adjusted so that the transfer of $Q_1$ to a blocking state, thus resetting the counter, occurs 60° after $-V_{AB}$ crosses zero.

The synchronized pulse resets all the counter stages to zero and forces transistor $Q_3$ to block for a 50 microsecond period. The voltage controlled oscillator 7 is initially set into oscillation as a result of the ± 15 volt power supply on lines 26, 27 being applied by field transistor $Q_9$, and a pulse is generated which is amplified by transistor $Q_8$. The initial voltage on capacitor $C_2$ is zero and consequently the oscillator formed with transistors $Q_7$, $Q_8$ operates at a frequency lower than the desired synchronous frequency of $128 \times 6 \times 2f = 1.536 \times 10^3 f$, where $f$ is the supply frequency (60 Hz). With the oscillator operating at a subsynchronous frequency the counter will be running slow with respect to the supply frequency. Consequently, when the synchronized pulse on line 6 causes transistor $q_3$ not to conduct, flip-flop $A_{10}$ will exhibit a ONE on line 11, while $A_2$ and/or $A_3$ will have ZERO. Therefore, capacitor $C_4$ is being charged from line 26, via diodes CR3, and CR11 or CR12. As a result $Q_5$ will produce a current proportional to the voltage on capacitor $C_4$ which will charge $C_2$ during the time interval that $Q_3$ is blocking. The additional voltage on $C_2$ will cause the collector current of $Q_6$ to increase and consequently shorten the conduction period for $Q_8$ in the oscillator. As long as the counter continues to operate at a subsynchronous frequency, additional charge will be added to capacitor $C_2$ upon each occurrence of a synchronized pulse. The voltage on $C_2$ will increase until the resultant increases in $Q_6$ collector current and oscillator frequency reach steady state synchronous operation. If $V_{C2}$ increases too much the frequency of the oscillator will drive the counter faster than the supply frequency. This causes $A_{10}$ to reach a zero state before the synchronized pulse occurs and $C_4$ to discharge before $Q_3$ assumes a blocking state. Thus, no charge will be added to $C_2$ during the synchronized pulse. The constant load on $V_{C2}$, R11 and R12, will cause $V_{C2}$ and the oscillator frequency to decrease slightly until a steady state mode of operation is reached. The steady state operating condition exists and voltage $V_{C2}$ has a quiescent value when the amount of charge added to capacitor $C_2$ during the duration of the synchronized pulse equals that discharged through R11 and R12 during the remainder of the cycle. The circuit is designed so that the voltae remaimding on $C_4$, during its discharge after flip-flop $A_2$ and $A_3$ have each assumed the state ONE and while $Q_3$ is blocking, produces the necessary current from $Q_5$ to maintain the proper voltage on $C_2$.

Steady state synchronous operation is reached after a period of about one second following the application of the ± 15 volt supply 28, 29. During synchronous operation the relative conduction periods of $Q_7$ and $Q_8$ in the oscillator are such that the voltage on $C_7$ never reaches the peak point voltage of field effect transistor $Q_9$, and $Q_9$ is inactive.

Figures 4A, 4B:
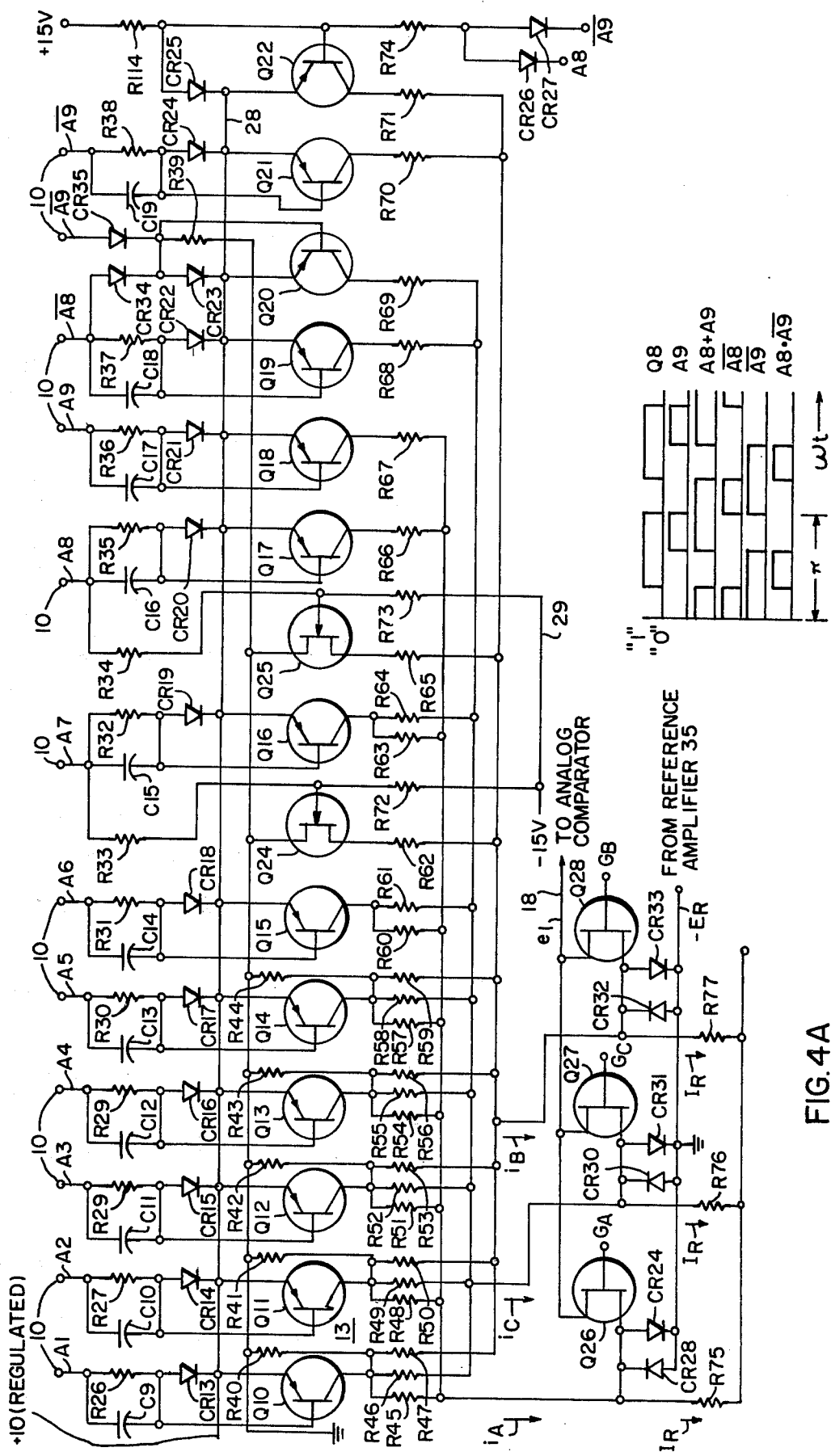
FIG. 4A shows a preferred implementation of the circuitry of the ramp generator and multiplexer of FIG. 1.
FIG. 4B is a graphical representation of the output gate drive waveforms used to build the timing waveforms.

Referring to FIG. 4A the circuitry of ramp generator 13 will now be described in detail.

A series of transistor, switches $Q_{10}$ through $Q_{22}$ are controlled by the respective outputs $A_1 - A_9$, $\overline{A_8}$ and $\overline{A_9}$ of flip-flops $A_1 - A_9$, as shown. Switches $Q_{17}$, $Q_{18}$ combine with $Q_{10} - Q_{16}$ to define waveform $i_A$, $i_A'$, switches $Q_{19}$, $Q_{20}$ combine with $Q_{10} - Q_{16}$ to define waveform $i_B$, $i_B'$. Similarly $Q_{21}$, $Q_{22}$ are affected with $Q_{10} - Q_{16}$ to waveform $i_C$, $i_C'$. The resulting composite saw-tooths are shown in FIG. 5B as curves k, l, and m. Appropriately weighted resistors R45–R71 associated with the outputs of these transistors derive from the +10 volt regulated supply on line 28 currents in a ladder of respectively weighted magnitudes proportional to the digital significance of flip-flops $A_1$ through $A_9$. These currents for each ladder are summed up to develop the sets of precision digitized ramp timing waveforms $i_A$, $i_B$, $i_C$ indicated in FIG. 2. The circuitry presents several features which assure a high quality for the ramp waveform. Speed-up capacitros $C_9 - C_{19}$ and shunting resistors R26-R38 contribute to a fast switching of transistors $Q_{10} - Q_{22}$. Also, resistors R40-R44, along with shunt FET's $Q_{24}$ and $Q_{25}$, minimize the interaction between the three outputs due to the potentials developed across the anti-parallel diode networks CR28-CR33 which clamp the voltages developed when $(i_A - I_R)$, $(i_B - I_R)$ and $(i_C - I_R)$ are not zero. Transistors $Q_{24}$ and $Q_{25}$ conduct when $Q_{15}$ and $Q_{16}$ block, respectively, and vice versa when transistors $Q_{15}$ and $Q_{16}$ are conducting. A forced gain of about 0.5 is used for each of the transistors $Q_{10}$ and $Q_{22}$ in order to limit the collector-emitter saturation voltages to a typical level of 20 mV which is 0.2% of the 10V reference voltage.

With each ladder of current is associated a switch ($S_A$, $S_B$, or $S_C$) controlled by a signal $G_A$, $G_B$ or $G_C$, performing within multiplexer 15 the function of selecting a corresponding ramp waveform. These switches consist of FET devices $Q_{26} - Q_{28}$ connected at the outputs of respective resistor networks. They conduct individually and in a sequential pattern as prescribed by their gate drive wave-forms $G_A$, $G_B$, $G_C$. The generation of the gate drive wave-forms is discussed hereinafter. The output voltage $e_1$ on line 16 to the Analog Comparator 18 is representative of the difference between the reference current $i_R$ and the timing waveform current as selected by the conducting switch $S_A$, $S_B$ or $S_C$.

Figure 5A:
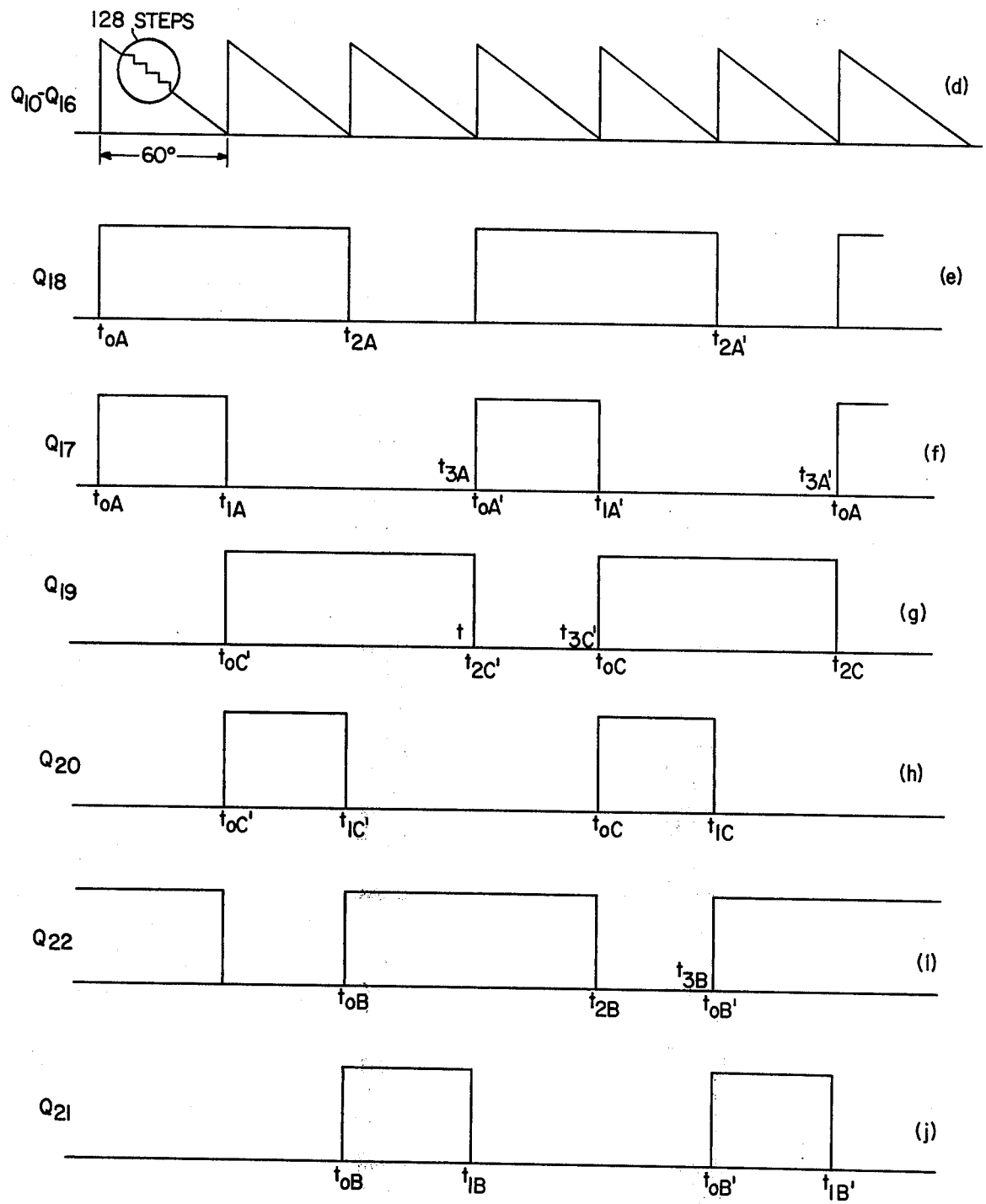
FIGS. 5A and 5B are a graphical representation of the timing waves and control pulses generated by the circuits of FIGS. 3 and 4A.
Figure 5B:
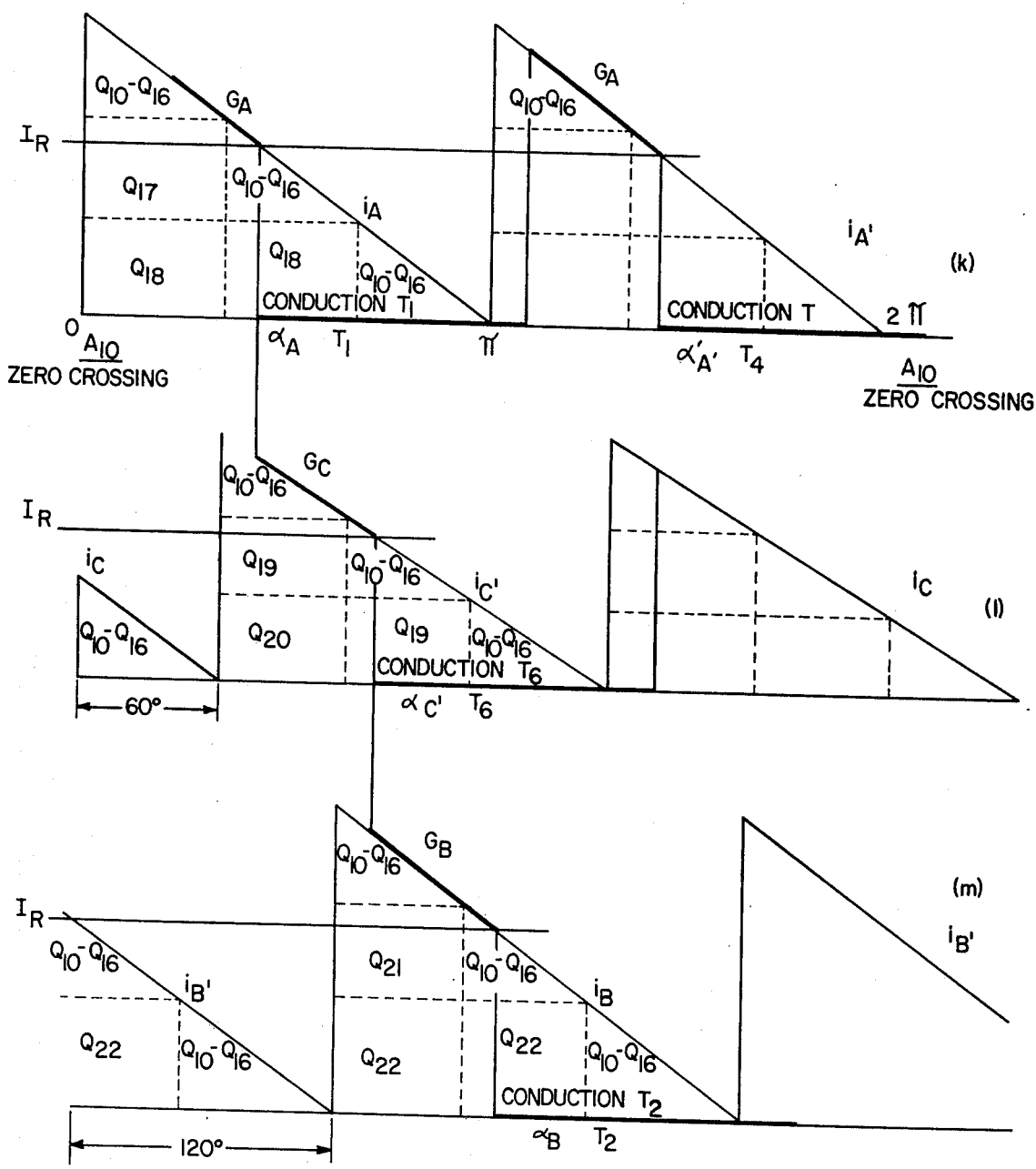

The operation of ramp generator 13 in relation to digital counter 9, can best be understood by reference to FIG. 5A in which:

Curve (d) represents the serrated saw-tooth generated when transistors $Q_{10} - Q_{16}$ are successively switched ON and OFF under digital control from counter 9. As a result the sums of the currents flowing through parallel resistors R45–R65 add up to form the curve represented by $d$ in FIG. 5A. The digital counter includes 128 digital combinations from the seven flip-flops $A_1$ to $A_7$. Therefore, each serrated saw-tooth on curve $d$ has 128 steps. When all the resistors are switched in parallel the maximum current is $I_1$, as determined by the regulated 10V source on line 28.

Generator 13 also includes three pairs of transistors, namely $Q_{17} - Q_{18}$, $Q_{19} - Q_{20}$ and $Q_{21} - Q_{22}$ which are associated by pairs with the respective switches $S_A$, $S_B$, and $S_C$. $Q_{17}$ is controlled by output ($A_8$) from flip-flop $A_8$. $Q_{18}$ is controlled by output ($A_9$) from flip-flop $A_9$. $Q_{19}$ is controlled by inverted output ($\overline{A_8}$) from flip-flop $A_8$. $Q_{20}$ is controlled by output ($A_9$) from flip-flop $A_9$ and $\overline{A_8}$ from flip-flop $A_8$. $Q_{21}$ is controlled by inverted output ($\overline{A_9}$) from flip-flop $A_9$ while $Q_{22}$ is controlled by both outputs ($A_8$) and ($A_9$) from flip-flops $A_8$ and $A_9$ respectively. Curves $e$ to $j$ on FIG. 5A show the time relation between the periods of conduction of transistors $Q_{18}$, $Q_{17}$, $Q_{19}$, $Q_{20}$, $Q_{22}$ and $Q_{21}$ respectively. The currents represented by each pulse has an amplitude of $I_1$. The vertical angle represented by each of the saw-tooths of curve $d$ is 60°. The pulses shown by curves $e$ to $j$ last either 60° ($Q_{17}$, $Q_{20}$, $Q_{21}$) or 120° ($Q_{18}$, $Q_{19}$, $Q_{22}$). Operation on phase A for the positive polarity (TA) in relation to switch $S_A$ is illustrated by the combination saw-tooths 1, 2, 3 of curve $d$ and the first pulse of curves $e$ and $f$. This results in a saw-tooth $i_A$ shown by curve $k$. The pulses when added up to the saw-tooth of curve $d$, generate a total current which decreases by very small steps continuously from $3I_1$ to zero over an 180° electric angle.

When current pulses of curves $g$ and $h$ are flowing through respective transistors $Q_{19}$, $Q_{20}$, concurrently with saw-tooth 2 of curve $d$, a saw-tooth current $i_C'$ is being generated regularly decreasing from $3I$. This saw-tooth is initiated 60° after the intiation of saw-tooth $i_A$. After another phase shift of 60°, the saw-tooth current $i_B$ is generated in the same fashion, then followed by saw-tooth $i_A'$, and so on until all the saw-tooths $i_A - i_C'$ have been successively generated.

Referring to switches $S_A$, $S_C$, $S_B$ of FIG. 4A which include FET devices $Q_{26} - Q_{28}$, respectively controlled by gate signals $G_A$, $G_C$, $G_B$, it is observed that the currents from the three phases $i_A$, $i_C$, $i_B$ are in opposition to parallel reference currents $I_R$ derived on parallel resistors R75–R77 from a reference voltage $-E_R$. Anti-parallel diodes CR28, CR29, CR30, CR31, CR32, CR33 connected to ground on one side and to the junction points of the opposite current paths ($i_A$, $I_R$; $i_C$, $I_R$ and $i_B$, $I_R$) establish a potential at one end of the associated switch depending on the current differences $|i_A - I_R|$, $|i_C - I_R|$ and $|i_B - I_R|$. When the FET device is gated, a signal $e_1$ is generated on line 19' at the other end of the FET device ($Q_{26}$, $Q_{27}$ or $q_{28}$) which is the comparison signal used by the analog comparator 18. When $e_1$ is equal to zero, the comparator generates the firing control signal in relation with the phase corresponding to the gating signal $G_A$, $G_C$ or $G_B$. Counter 9 recurrently selects $i_Ai_C'$, $i_B$, $i_A'$, $i_C$, $i_b'$ and so on. Then, multiplexer 15 is controlled by one of the lines 60, 61 or 62 to have transitions at $\alpha_A$, $\alpha_C'$, or $\alpha_B$ etc. Conduction of the fired rectifier extends between two successive such transitions along the curve $k$, $l$ or $m$.

II. THE FIRING PULSE CONTROL SECTION

Figure 6:
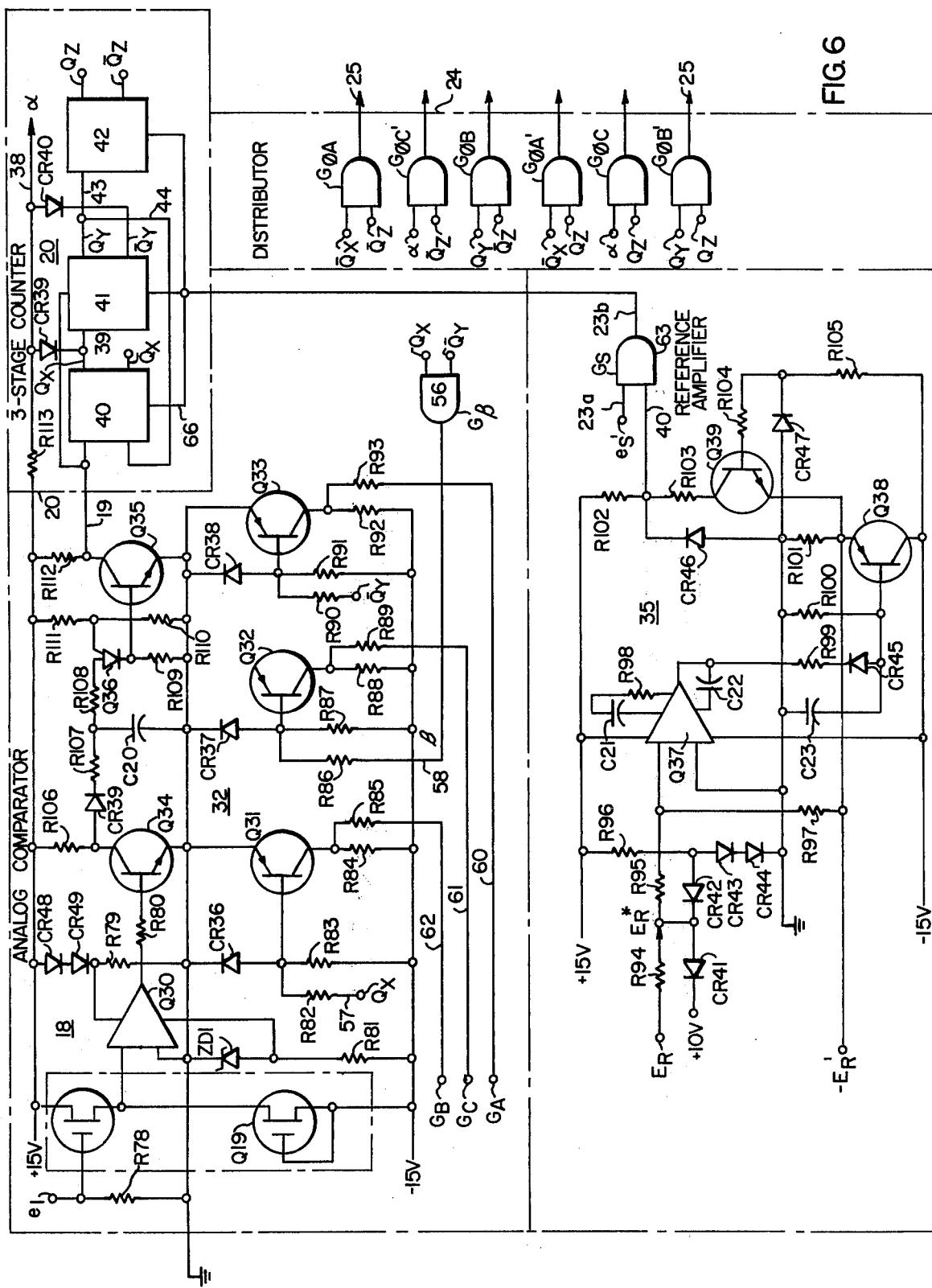
FIG. 6 illustrates in a preferred implementation the ring counter, the analog comparator and the distributor circuits of FIG. 1.

The schematic diagram for this section is shown in FIG. 6. The analog comparator section includes a high speed differential voltage comparator, a pulse generator, and the control circuitry for switches $S_A$, $S_B$, and $S_C$ of FIG. 4A. The input to the voltage comparator on line 16 is the voltage $e_1$ derived as shown in FIG. 4A. $e_1$ is respectively proportional to ($i_A - I_R$), ($i_C' - I_R$), ($i_B - I_R$), etc. depending on the states of $S_A$, $S_B$ and $S_C$. Effectively $e_1$ is $> 0$ when ($i_A - I_R$) $> 0$, and $< 0$ when ($i_A - I_R$) $< 0$ while $S_A$ is conducting. A similar relation exists for the period when $S_C$, or $S_B$, is conducting. A matched pair of MOS transistors, $Q_{29}$, provides a very high impedance to relatively low impedance transfer function with negligible offset voltage to suitably drive the voltage comparator without adversely loading $e_1$. The output of the voltage comparator 18 drives $Q_{34}$ into saturation when $e_1$ is positive and into a blocking state when $e_1$ is negative. About 10 microsecond after $Q_{34}$ transfers from a saturated to a blocking state, capacitor $C_{20}$ is being charged sufficiently to cause a programmable unijunction transistor (PUT) $Q_{36}$ to fire. As $Q_{36}$ fires, $Q_{35}$ saturates producing a trigger pulse on line 19 that advances the state of the 3-stage counter ($Q_X$, $Q_Y$, $Q_Z$) by one step.

The least significant change in $e_1$ must be greater than the sensitivity of the voltage comparator which is in this case about 3 mV. The component values used in the embodiment are such that the minimum change in $e_1$ is about 12 mV.

Figure 7:
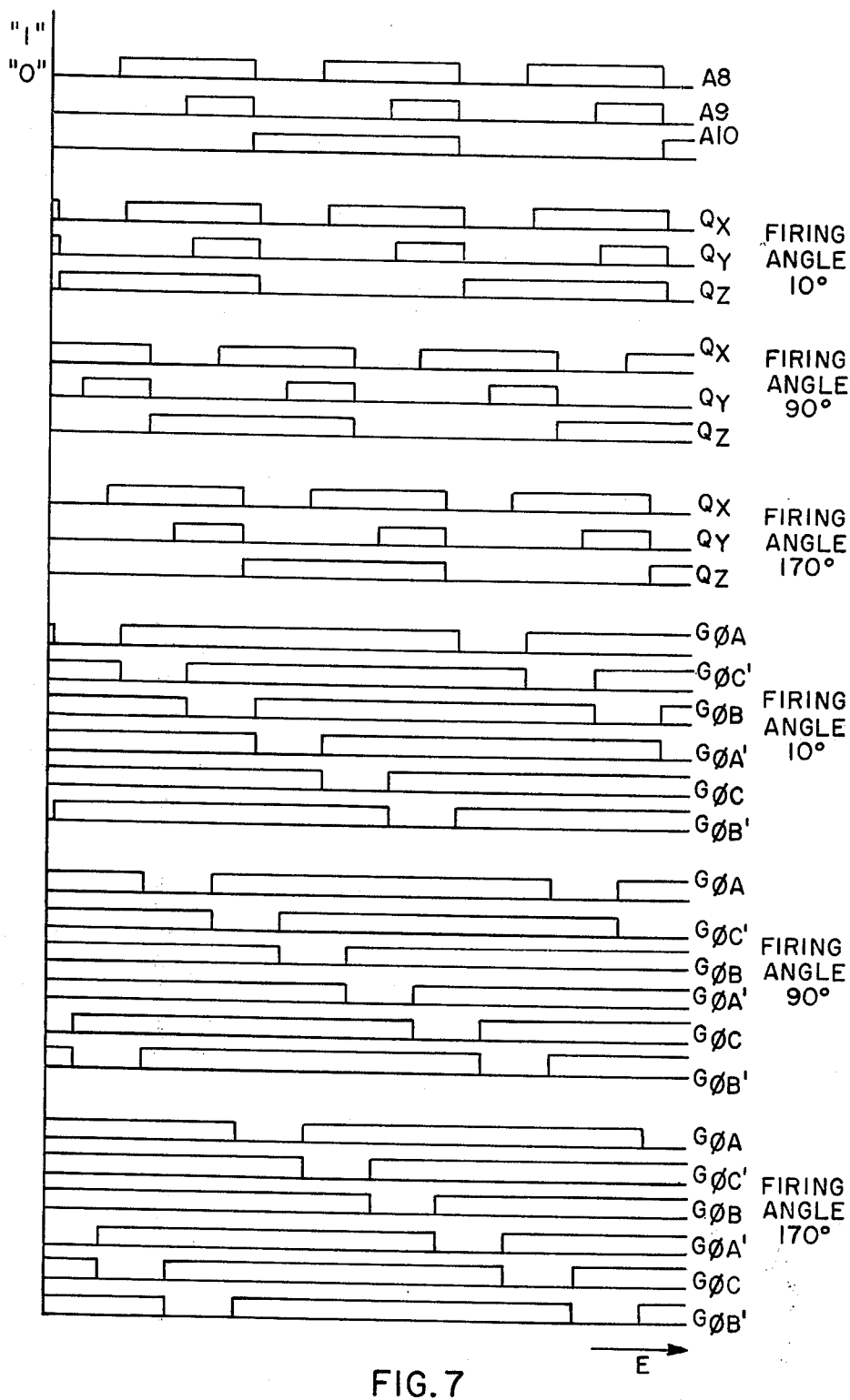
FIG. 7 is a graphical representation of the operation of the 3-stage counter and of the distributor of FIG. 6 for various firing angles.

The three-stage counter 20 is comprised of J-K flip-flops 40, 41 and 42. Flip-flops 40 and 41 perform a divide by three function and the flip-flop 42 performs a divide by two operation in the same manner as $A_8$, $A_9$ and $A_{10}$ in the digital counter. Six discriminate states are developed in this counter which are used to:

1. determine which timing waveform $i_A$, $i_B$, or $i_C$ is to be compared to $I_R$ at any given instant, and
2. develop the desired gate drive patterns for the converter power thyristors. The three-stage counter 20 operates in a ring-counter mode driven by the trigger pulses on line 19 from the analog comparator. During a steady state condition (when $E_R$ is constant) flip-flops 40, 41 and 42 operate synchronously but out of phase with $A_8$, $A_9$ and $A_{10}$ as illustrated in FIG. 7. The phase displacement is dependent on the magnitude of the control reference signal $E_R$ which is supplied at 36 as input to operational amplifier $Q_{37}$ of reference amplifier 35 (FIG. 6). For $E_R = E_{MAX}$, the simultaneous zeros of $Q_X$, $Q_Y$ and $Q_Z$ start near the beginning of the simultaneous zeros for $A_8$, $A_9$ and $A_{10}$ and this represents a firing angle condition of about 10°. For $E_R = E_{MIN}$, the simultaneous zeros of $Q_X$, $Q_Y$ and $Q_Z$ start just before the beginning of the one state for $A_{10}$ representing a firing angle condition of about 170°. With $E_R = (E_{MAX} + E_{MIN})/2$, a firing angle of about 90° is created.

NAND gates $G_{\phi A}$, $G_{\phi B}$, $G_{\phi C}$, $G_{\phi A}'$, $G_{\phi B}'$, and $G_{\phi C}'$ of FIG. 6 decode the states $Q_X$, $Q_Y$, and $Q_Z$ of flip-flops 40, 41, 42 to obtain a set of six control waveforms as illustrated in FIG. 7. These exhibit the phase dependency of $Q_X$, $Q_Y$ and $Q_Z$ on $E_R$.

The reference amplifier 35 is comprised of operational amplifier $Q_{37}$, emitter-follower $Q_{38}$, and the associated components indicated in FIG. 6. The output $-E_R'$ is a negative voltage proportional in magnitude to signal $E_R^*$. The input voltage $E_R$ normally will vary from 0 volts to about +12 volts. Diodes CR41 – CR44 constrain the magnitude of $E_R^*$ to within a range of about $=0.7$ volts to $=10.7$ volts. $-E_R'$ is proportionately limited so that the range of $I_R$ is controlled and end stops for the phase controller are produced. An intentional lag in the dynamic response of $-E_R'$ to $E_R$ is introduced by capacitor C23 so that $-E_R'$ will not vary instantaneously. This delay enables the analog comparator to accurately discriminate every crossover that exists during the dynamic response due to a step function change in the input.

Figure 8:
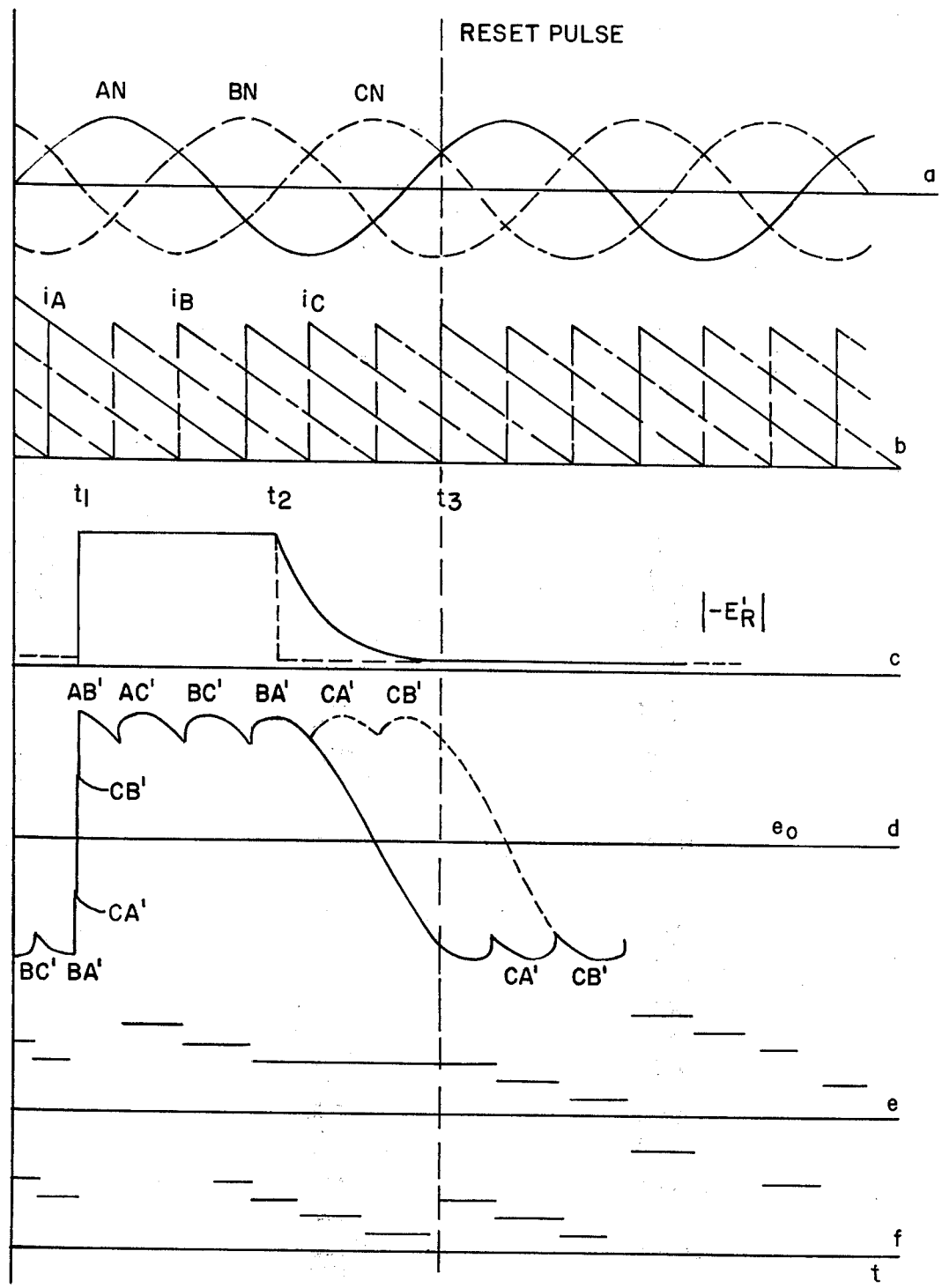
FIG. 8 illustrates the phase controller operation when transferring from "rectification" to "inversion"

The delay is not symmetrical for both directions of response. For increasing values of $|-E_R'|$ the delay exponential time constant is approximately R99·C23 which is about 100 microsecond. As illustrated in FIG. 8 at point $t_1$, the response in the converter output voltage, $e_o$, to a rapid increase in $-E_R'$ is practically instantaneous. An equivalent decrease in $-E_R'$, at point $t_2$, results in a converter output response as indicated by the dotted portion of the waveform in line $d$. A problem arises because the analog comparator accepts the crossover at point 1 on the $i_C'$ timing waveform as a valid crossover. Furthermore, the subsequent crossovers at points 2 and 3 on $i_B$ and $i_A'$ are also accepted. The result of these "extra" crossovers is that a 180° reversal in the output of the phase controller has occurred which is not corrected until point $t_3$ is reached, at which time a reset pulse (to be described later) to counter 20 realigns the phase controller.

A R100·C23 time constant of about 2 milliseconds delays the negative transient response of $|-E_R'|$ as indicated by the solid portion of $|-E_R'|$ in line C following $t_2$. The corresponding desired response of $e_o$ is illustrated by the solid portion of line $d$. Line e shows the gate drive patterns which produces the converter response indicated by the solid lines whereas line $f$ shows the gate drive pattern for the dotted line response.

Transistor $Q_{39}$, NAND gate 63 and the associated components perform a set function which properly aligns the $Q_X$, $Q_Y$ and $Q_Z$ counter. This counter is capable of operting in a mode where $Q_Z$ would be 180° out of phase with its proper alignment since the selection of timing waveforms for the analog comparator is dependent only on the states of $Q_X$ and $Q_Y$. When the magnitude of $|-E_R'|$ is sufficiently low $Q_{39}$ assumes a blocking state such that when $e_s'$, which occurs simultaneously with $e_s$ for the 10-stage digital counter, momentarily assumes a one state, and an output pulse from set gate 63 (from a one to a zero back to a one) is produced on line 23b. This pulse sets flip-flops 40, 41 and 42 of the ring counter 20 into the desired states if they are not already there at that instant. As the magnitude of $-E_R'$ increases the reset pulse from set gate 63 must be prevented in order not to interfere with the proper operation of the circuit. Thus, when $|-E_R'|$ is greater than a certain level, $Q_{39}$ saturates and forces the output of set gate 63 to remain in the ONE state.

The control circuit 32 for selector switches $S_A$, $S_B$, and $S_C$ of FIG. 4 is shown in FIG. 6. When the potential $Q_Y$ of flip-flop 41 corresponds to a ONE state (>6V) transistor $Q_{33}$ is cut-off so that the voltage at $G_A$ is −15V which holds $Q_{26}$ ($S_A$ in FIG. 4A) in a blocking state. As $Q_Y$ goes to the zero state (<1V), $Q_{33}$ conducts pulling $G_A$ up to a potential of about −0.2V which enables $Q_{26}$ to conduct. $Q_{31}$ and $Q_{32}$ act similarly to control the conduction of $Q_{28}$ and $Q_{27}$ ($S_B$ and $S_C$. See FIG. 4A. Since only one of $Q_X$, $\beta$, and $\overline{Q_Y}$ is at a zero state at a given time, only one of $S_A$, $S_B$, or $S_C$ are able to conduct during that period.

III. ALTERNATE EMBODIMENT WITH DIGITAL REFERENCE VOLTAGE

Figure 9:
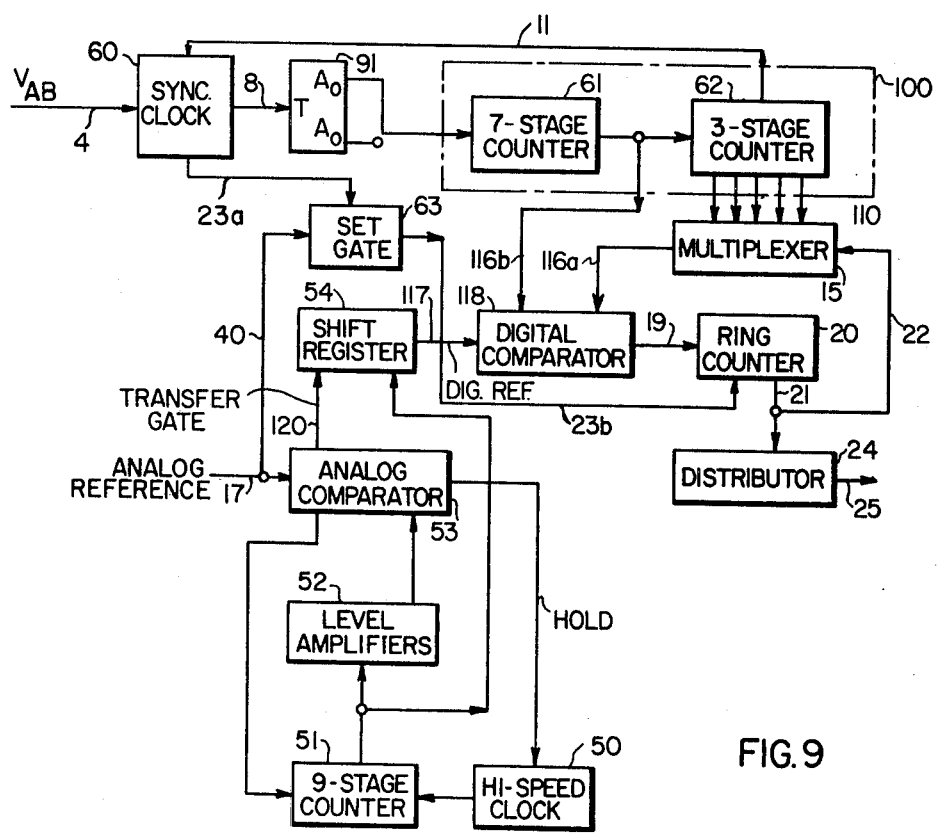
FIG. 9 shows a second embodiment of the digital pulse generator according to the present invention.

If an analog reference signal is supplied an A/D converter is employed to convert the analog reference signal into a digital reference signal. A block diagram of the digital phase controller is shown in FIG. 9. The synchronized clock 60 is equivalent to the combination of the zero-crossing detector 5 and the variable frequency oscillator 7 of FIG. 1. The 7-stage counter 61 and the 3-stage counter 62 together form a ten-stage counter 100 equivalent to the digital counter 9 of FIG. 1. As in FIG. 1, the most significant digit of the 3-stage counter 62 generates the Nth pulse on line 11 which serves to synchronize the clock pulses at the output on line 8. Also on FIG. 9 a set gate 63 is provided responsive to the synchronizing pulse on line 23a to generate a signal on line 23b for aligning the ring counter 20 which controls the distributor and gating circuit 24.

The main difference here resides in that comparator 118 of FIG. 9 is a digital comparator whereas comparator 18 of FIG. 1 is analog. As in FIG. 1, and according to the present invention, the comparator triggers the ring counter 20. Ring counter 20 establishes via lines 21, 22 a concordance between its own digital state and the state of the multiplexer so as to insure tht the proper phase selection is made at the time of reading the digital output of the 3-stage counter 62. The selected waveform is digital and appears on lines 116a from the 3-stage counter 62 and on lines 116b from the 7-stage counter 61. Lines 116a and 116b correspond to line 16 of FIG. 1. The digital count on lines 116a, 116b is compared with the reference digital count 117 in the digital comparator 118. The triggering signal is generated on line 19.

In the embodiment of FIG. 9 the digital reference is obtained after conversion from an analog reference. The A/D converter is comprised of a high-speed clock 50, a 9-stage counter 51, level amplifiers 52, an analog comparator 53, and a shift register 54. The high-speed clock 50 drives the 9-stage counter 51 at a rate significantly higher than that of the synchronous clock 60. The level amplifiers 52 produce an analog equivalent of the state of the 9-stage counter 51. Whenever the output of the level amplifiers becomes less than the analog reference the analog comparator produces a hold pulse which stops the high-speed clock 50 and momentarily retains the 9-stage counter 51 in a fixed state equivalent to a comparison between said counter state and the analog reference. During the hold period the information represented by the state of the 9-stage counter is transferred to the shift register when a gate is released by the analog comparator. Thereafter, the gate is "closed" to retain the shift register in a fixed state as a reset signal is being produced to set the 9-stage counter in its "starting" state. After this is accomplished, the hold on the high-speed clock is released and the A/D converter proceeds to make another comparison. Following each comparison the information in the shift register is updated in order that the output of the shift register be representative of the analog reference existing at that instant and such representation is held until the next comparison is to be made.

Functionally, the digital phase controller of this second embodiment operates in the same manner as the hybrid analog digital phase controller of the first embodiment. The synchronous clock 60, the 7-stage counter 61, and the 3-stage counter 62, respectively perform the same functions as the synchronized counter 26 in the hybrid analog digital phase controller of FIG. 1. The 3-stage counter 62 and distributor 24 also operate in the same manner as did their counterparts. There is no similarity however, in how the timing waveforms are produced, compared with synchronous counter 26 since here the timing waveforms are digital and are compared to the digital reference directly by the digital comparator 118. As each comparison is made by the digital comparator 118 a trigger pulse is produced which advances the 3-stage counter 62 and causes multiplexer 15 to set up the next "digital" timing waveform and appropriately changes the output of distributor 24.

Figure 10A:
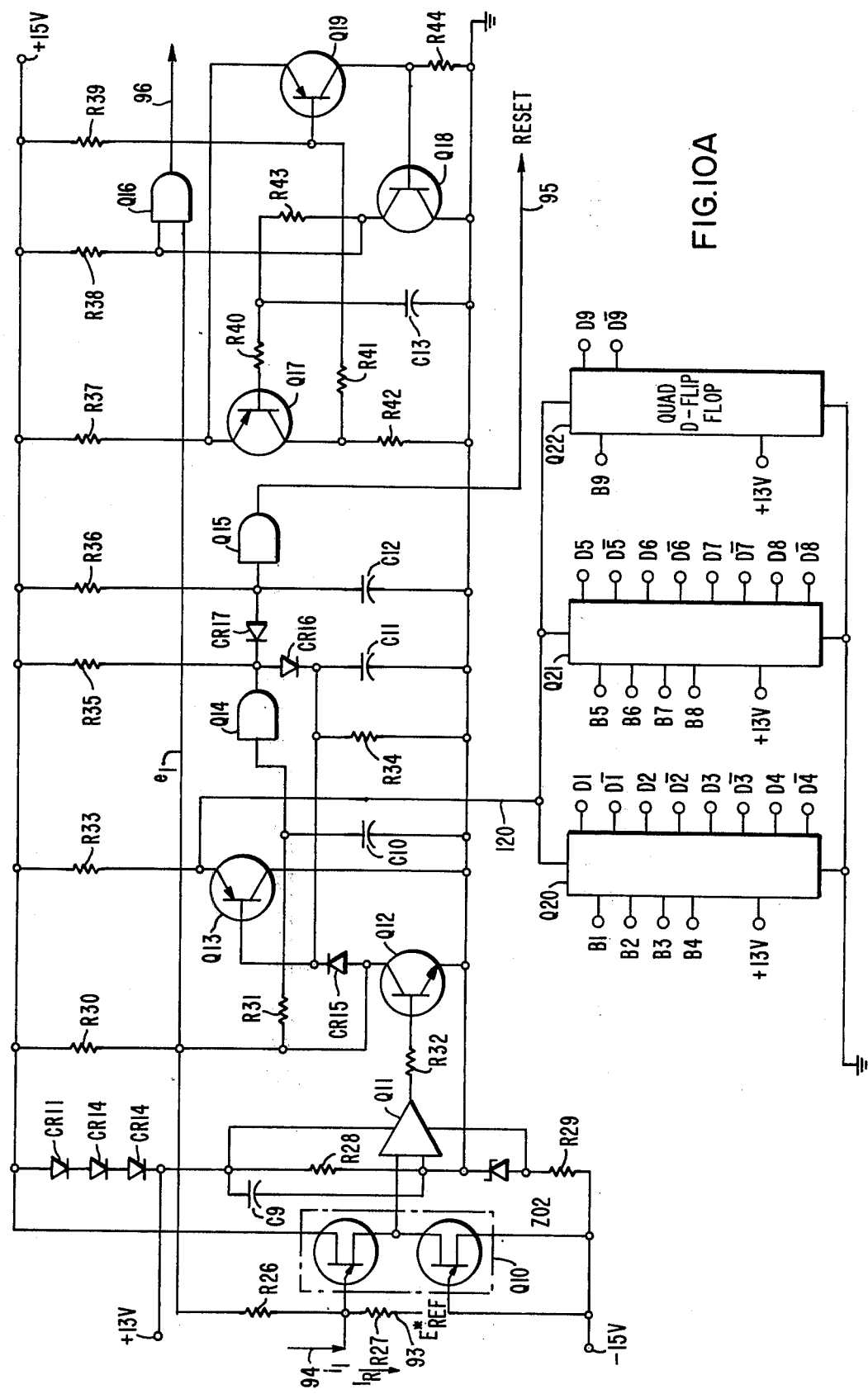
FIG. 10A shows a preferred implementation of the analog comparator circuit of FIG. 9.
Figure 10B:
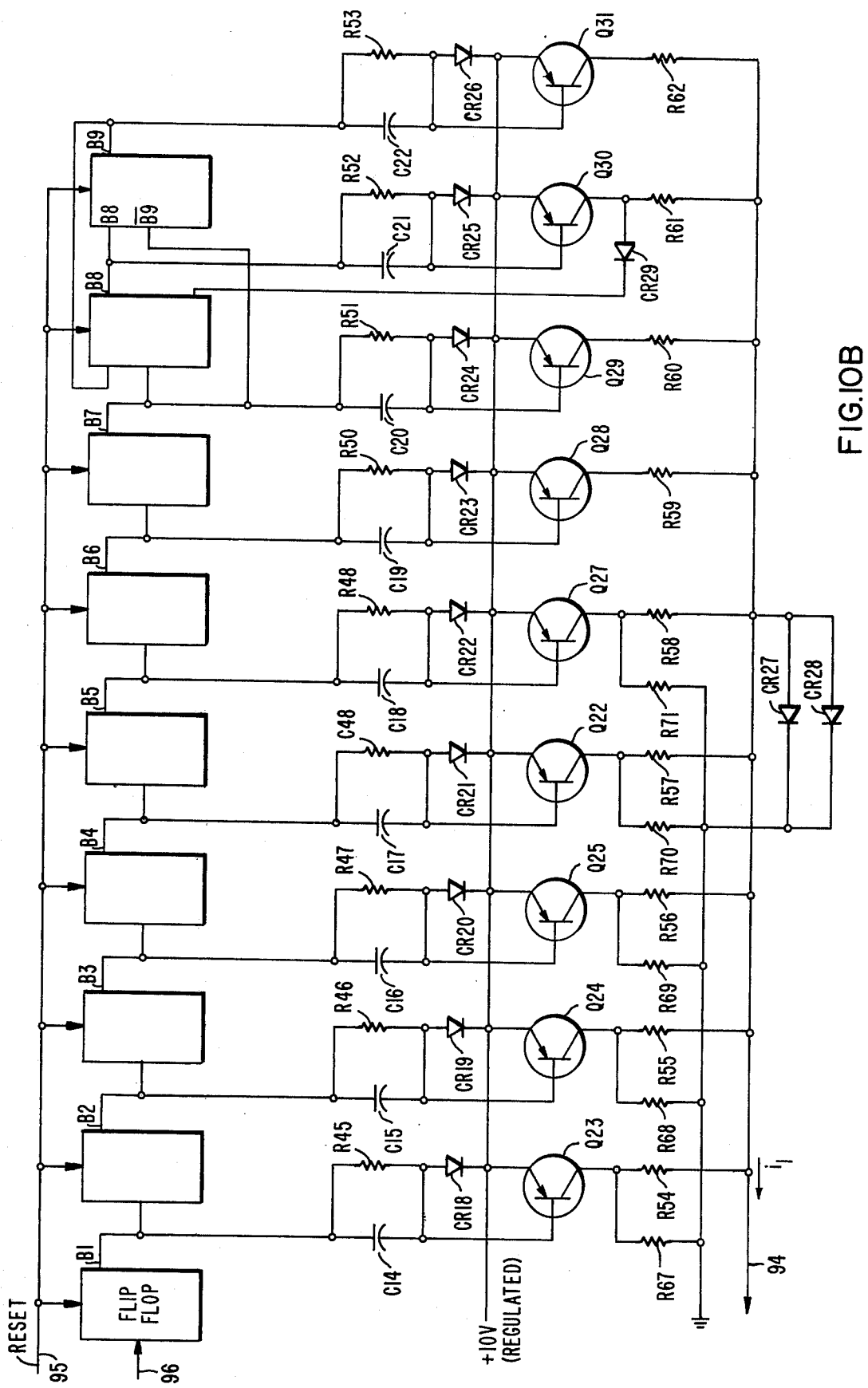
FIG. 10B illustrates the 9-stage counter and level amplifiers of FIG. 9.

FIGS. 10A and 10B show the circuitry for the high-speed clock 50, 9-stage counter 51, level amplifiers 52, analog comparator 53, and shift register 54.

The high-speed clock 50 consists of $Q_{17} - Q_{19}$, NAND gate $Q_{16}$, and associated components. $Q_{17}$ and $Q_{19}$ comprise a Schmidt trigger which is forced to oscillate due to the negative feedback from $Q_{18}$. When $Q_{19}$ and $Q_{18}$ are blocking, $Q_{17}$ conducting, the voltage on the capacitor $C_{13}$ increases until $Q_{17}$ is cut off. As $Q_{17}$ cuts off $Q_{19}$ and $Q_{18}$ conduct forcing the capacitor voltage to decrease until $Q_{17}$ turns back on again. As $Q_{17} - Q_{19}$ oscillates and with $e_1$ normally at a potential of about +11V, a train of trigger pulses is produced on line 96 serving as a clock for the 9-stage counter of FIG. 10B.

Figure 11:
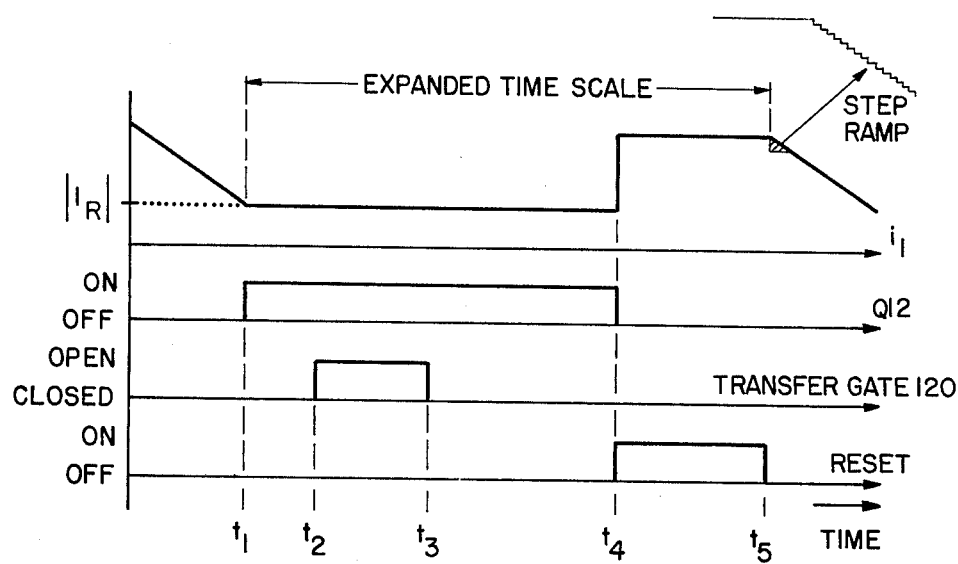
FIGS. 11 and 12 are graphical representations illustrating the operation of the analog comparator of FIG. 9.

The 9-stage counter 51 and level amplifiers 52, as shown in FIG. 10B, are basically the same as in the first embodiment and operate in much the same manner. (A tenth stage on the counter is omitted since the function of discriminating between half cycles is not required in the A/D converter.) Reference is made to FIG. 11 to describe the operation of the analog comparator 53. $i_1$ appearing on line 94 (FIG. 10A) is an analog representation of the instantaneous state of the ring counter. With $i_1 > I_R$ the input voltage to the analog comparator amplifier, $Q_{11}$ in FIG. 10A is such that the output of $Q_{11}$ is negative. Correspondingly, $Q_{12}$ is in a blocking state. The counter continues operating until at $t_1$, $i_1$ becomes less than $|I_R|$ and $Q_{11}$ output goes positive. This turns $Q_{12}$ ON and forces the clock output of $Q_{16}$ to hold in a one state stopping the counter. A small amount of regenerative feedback is provided through R26 to assure that $Q_{11}$ output remains positive. About 4µ sec later at $t_2$, $C_{11}$ has discharged so that the output of emitter follower $Q_{13}$ enables the state of the digital counter to be transferred via transfer gate line 120 to the shift register comprised of $Q_{20} - Q_{22}$. At the time $t_3$, $C_{10}$ has discharged sufficiently to cause the output of $Q_{14}$ to transfer to a one state which returns the transfer gate ($Q_{13}$) to a closed condition. Later, at $t_4$, $C_{12}$ will have charged sufficiently to transfer the output of $Q_{15}$ to a zero state which resets the counter. As the counter is reset $i_1$ on line 94 (FIG. 10A) becomes $> |I_R|$ forcing $Q_{11}$ and $Q_{12}$ to return to a negative output and an OFF state respectively. At $t_5$, $Q_{14}$ returns to a zero state forcing $Q_{15}$ to a one state which releases on line 95 the reset to the counter and initiates the start of another comparison. The entire process occurring between $t_1$ and $t_5$ takes about 30 microseconds.

Figure 12:
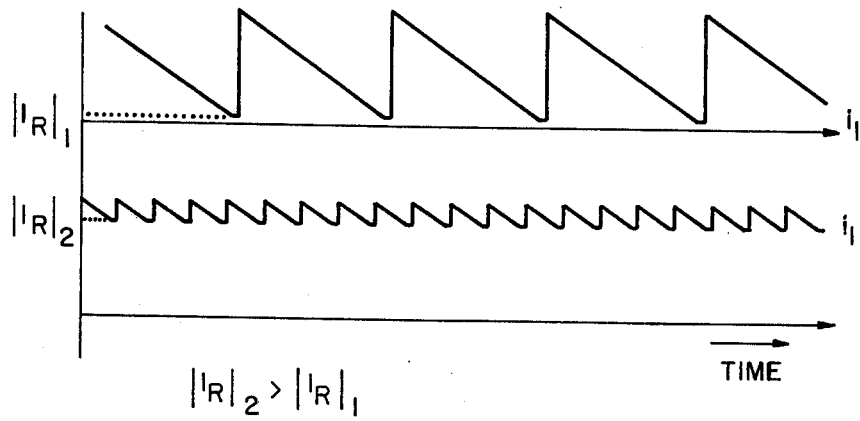

The rate at which comparisons are made by the analog comparator depends upon the magnitude of $I_R$ as illustrated in FIG. 12. The larger the magnitude of $I_R$ the greater the rate of comparison. The minimum comparison rate is about 1.4 kHz and occurs when $I_r$ is minimum. A maximum comparison rate for $I_{R\ MAX}$ is about 10 kHz.

The synchronous clock, 7-stage counter, and 3-stage counter are the same as in the first embodiment, except that a pre-counter stage 91 having outputs $A_o, \bar{A}_o$ has been inserted between the clock output and counter input, as schematized in FIG. 9. The additional counter 91 is used in the operation of digital comparator 118. To obtain the same clock rate for the $A_1 - A_{10}$ counter stages the synchronous clock is modified to produce an output frequency twice that used in the previous system.

Figure 13:
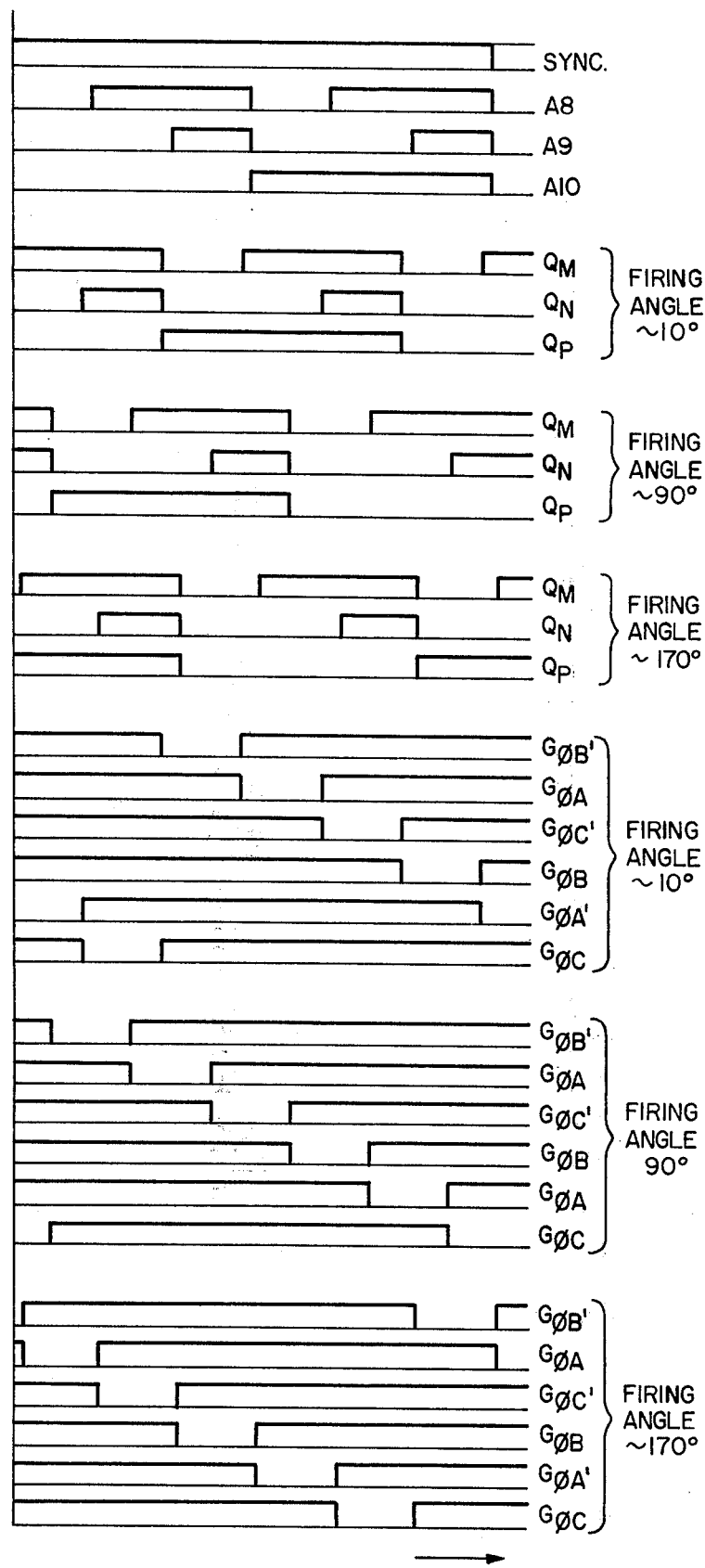
FIG. 13 is a graphical representation of the operation of the 3-stage counter and of the distributor of FIG. 10E.

Diagrams of the circuitry of the digital comparator 118, multiplexer 15, 3-stage counter 62, and distributor 24 are shown in FIGS. 13 and 14. The digital comparator is comprised of two sections. The first section (FIG. 10C) compares the first seven bits of the digital reference with those of the 7-stage counter. The net output of the 7-stage counter is a digital timing waveform analogous to that of curve $d$ in FIG. 5A. The equality of the state of this counter to a particular state of the first 7 bits (D1–D7) of the digital reference defines a firing angle within a given 60° segment. The particular 60° segment which is needed to complete the discrimination of a particular firing angle (within a 180° range) is prescribed by the last two bits of the digital reference. The multiplexer 15 and the section of digital comparator indicated in FIG. 10E perform the desired comparison between these two most significant reference bits and the digitalized timing waveform. The multiplexing performed within such selector-digital comparator effectively develops three timing waveforms from the primary timing waveform directly obtained from the 7-stage counter and 3-stage counter. The state of 3-stage counter $Q_M$, $Q_N$, and $Q_P$ (FIG. 10D) determines which digitalized timing waveform is being compared to the digital reference. The distributor 24 (FIG. 10E) decodes the states of $Q_M$, $Q_N$ and $Q_P$ to produce the indicated thyristor gate drive signals.

Figure 10C:
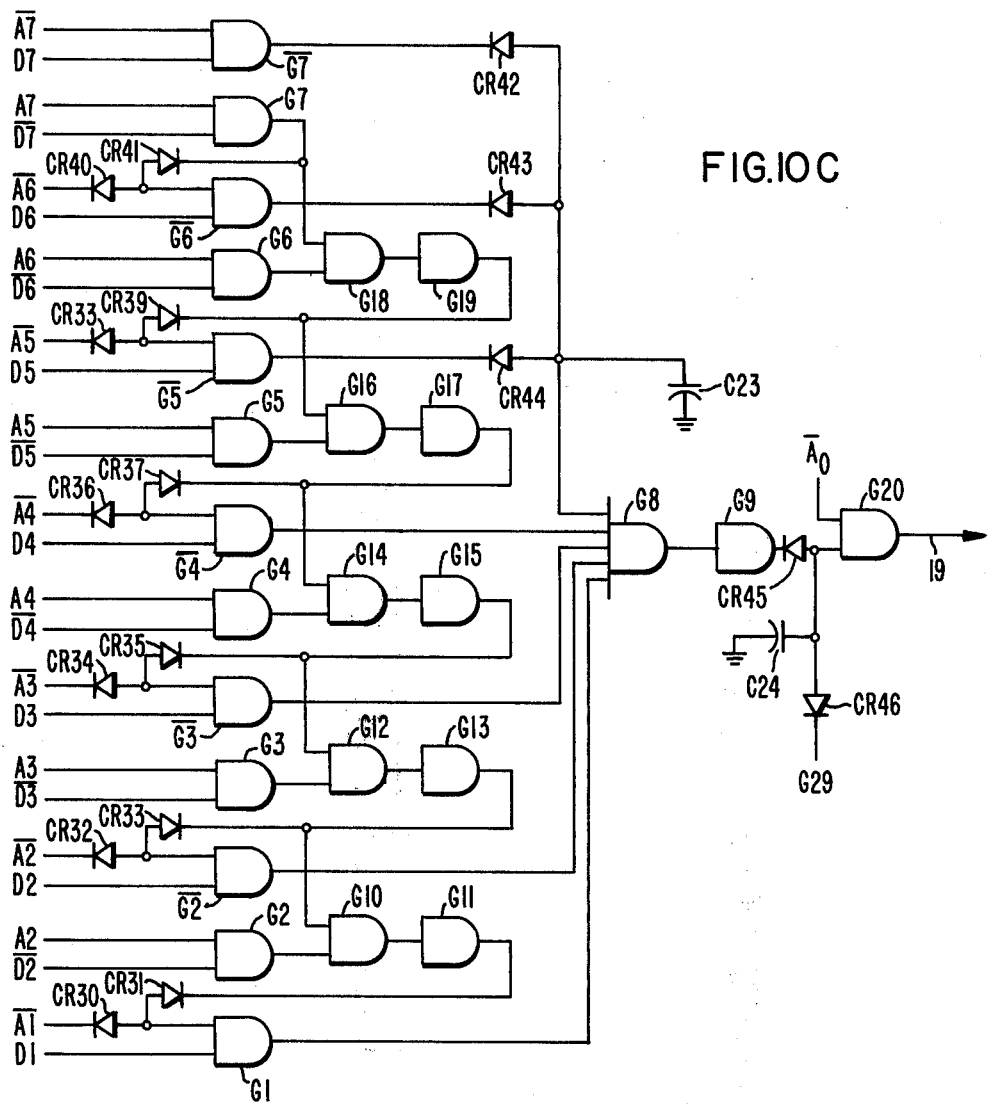
FIG. 10C shows the 7-stage comparator.

The 7-stage comparator 61 (NAND gates G1–G19, $\overline{G1}$–$\overline{G7}$) of FIG. 10C produces a zero output from G9 whenever the digital count of the synchronous 7-stage counter (A1–A7) is less than that represented by the first 7 bits of the digital reference (D1–D7). When the digital count of A1–A7 is greater than or equal to that of D1–D7 the output of G9 is a one. The output of G29 for the digital comparator 118, in FIG. 10E, is dependent on the digital reference signal D8–D9 and the state of the digital timing waveform prescribed by the selector. The dependency is as follows:

1. For D8 and D9 defining a firing angle between 0° and 60°, G29 is a one for the timing waveform being within the 0° 14 120° range and G29 = 0 for the timing wave-form being within the 120° 14 180° range.

2. For D8 and D9 defining a firing angle between 60° and 120°, G29 = 1 for the timing waveform being within the 60° – 180° range and G29 = 0 for the timing waveform being within the (0° – 60°) range.

Figure 10D:
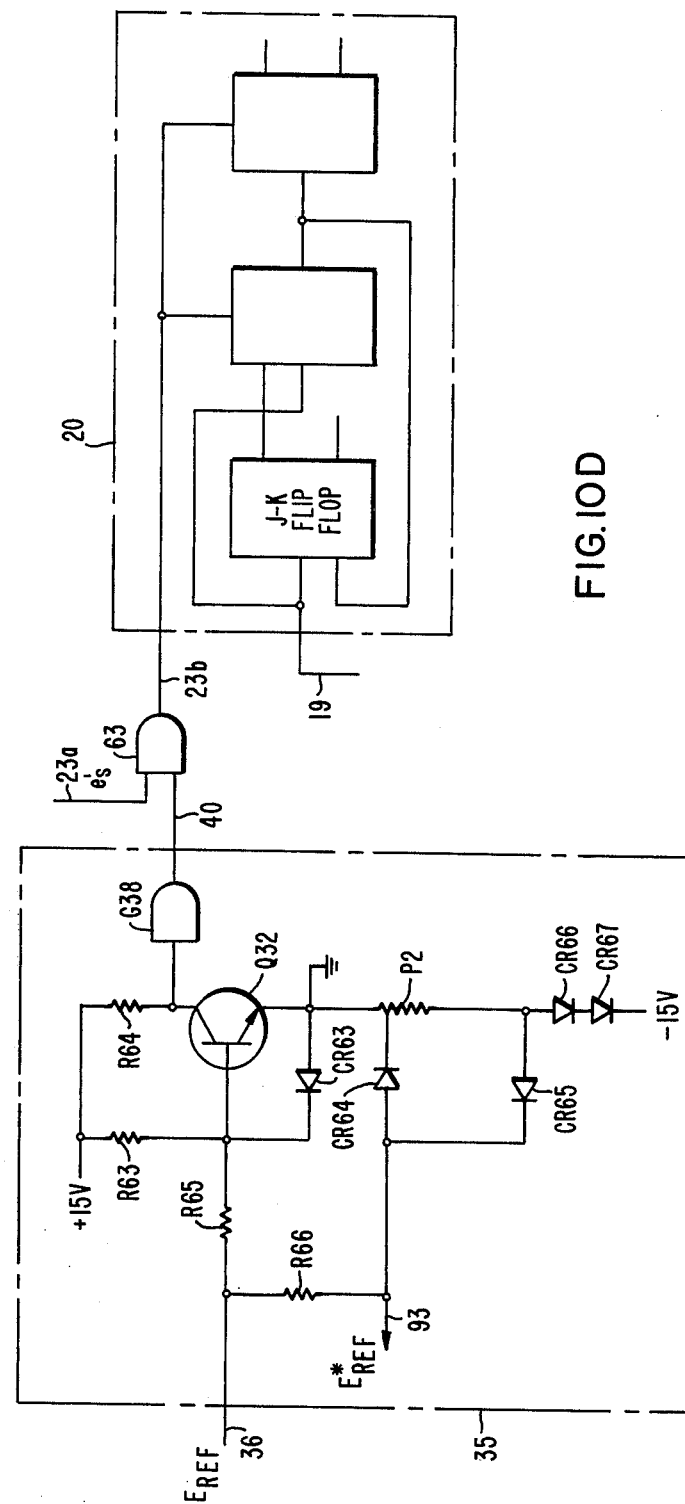
FIG. 10D shows the end-stop circuitry and the set gate.

3. For D8 and D9 defining a firing angle between 120° and 180° G20 = 1 only for the timing waveform being within the 120° – 180° range. A comparison between the timing waveform and digital reference is made when both G9 and G29 outputs are ones. With both G9 and G29 ones the high frequency pulse train of $A_o$ produces a trigger pulse output from line 10 (FIG. 10C) which advances the $Q_M$, $Q_N$, and $Q_P$ counter one step (FIG. 10D). This sets up the next timing waveform and appropriately advances the distributor to produce another gate drive pulse. The oncoming timing waveform being less than the digital reference causes either G9 or G29 or both to return to zero states which prevents another G20 trigger pulse from being produced until another comparison is obtained. Capacitors $C_{23}$ and $C_{24}$ in FIG. 10C filter out unwanted spikes which occur during the operation of the comparator.

The set gate 63, along with the end stop circuitry shown in FIG. 10D properly aligns the 3-stage counter $Q_M$, $Q_N$, and $Q_P$. The analog reference signal $E_{REF}$ varies between 0 and −15V. For $E_{REF}$ between approximately 0 and −2.5V the resultant firing angle of the phase controller is between 150° and 180°. With $E_{REF}$ within this range $Q_{32}$ conducts forcing G38 into a one state and the output 23b of set gate 63 is permitted to respond to the $e_s'$ signal on line 23a developed by the crossover detector of FIG. 3. With the output of set gate 63 active, $Q_M$, $Q_N$, and $Q_P$ are set into properly aligned states. However, as $E_{REF}$ exceeds −2.5V in the negative direction, $Q_{32}$ and G38 reverse their states and $G_{SET}$ becomes inactive so that the phase controller is not adversely effected by $e_S'$ as the firing angle advances.

End stops for the phase controller are obtained by limiting the minimum and maximum values of $E_{REF}^*$ on line 93 (FIG. 10A). The setting of potentiometer P2 limits the minimum absolute value of $E_{REF}^*$. The corresponding firing angle of the phase controller prescribed by $$|I_R|_{MIN} = \frac{E_{REF}^* |_{MIN}}{R27}$$

fixes the inversion end stop. Diodes CR65–CR67 limit $|E_{REF}|_{MAX}$ to about $-14.3$ volts and fixes the maximum value of $I_R$. For an $I_R$ corresponding to a $E_{REF}^* = -15V$ resulting in a firing angle of 0°, a rectification end stop of $\sim .7/15 \times 180° \cong 8.4°$ is established. The "rectification" end stop may be changed by suitably changing R27.

The dynamic response of this phase controller is predominately determined by the conversion rate of the A/D converter. The most adverse transient response condition occurs when a step function change from a fully advanced firing angle to a fully retarded firing angle is required. In this case the A/D converter takes about 0.6 msec to effect the change. This length of time is sufficiently short that it produces no noticeable delay in the response of the system.

I claim:

1. Digital firing pulse generator for generating and applying firing pulses to a plurality of controlled rectifiers connected as a polyphase arrangement in an alternating current power supply comprising:
   first counter means synchronized with the power supply for generating a plurality of timing waveforms related to respective phases of said power supply;
   comparator means for comparing one of said timing waveforms with a reference signal for generating a control signal defining a firing angle for the next controlled rectifier to be fired;
   ring counter means responsive to said control signal for providing a logic representation of said next controlled rectifier;
   gating means responsive to said ring counter means for selecting said next controlled rectifier and for firing the same; and
   multiplexer means interposed between said first counter means and said comparator means for selecting said one timing waveform, said ring counter means controlling said multiplexer means to select as said one timing waveform a timing waveform corresponding to the phase associated with said next controlled rectifier.

2. The generator of claim 1 with said reference signal being an analog signal and said comparator means including an analog comparator, with said first counter means including means for generating a plurality of ramp signals in response to a plurality of digital counts stored in said counter means, each said digital counts corresponding to a phase of said power supply associated with a corresponding one of said controlled rectifiers, and with said multiplexer means including a plurality of corresponding switches.

3. The generator of claim 1 with said reference signal being derived in digital form and said comparator means including a digital comparator, with said first counter means including a lower significant bit section and a higher significant bit section, said multiplexer means beng operative on said higher significant bit section to alter the contents thereof; and
   with said digital comparator being responsive to said lower significant bit section and to said altered higher significant bit section to derive a digital timing waveform for comparison with said digital reference signal.

* * * * *